(12) United States Patent
Wang et al.

(10) Patent No.: US 6,441,754 B1
(45) Date of Patent: Aug. 27, 2002

(54) APPARATUS AND METHODS FOR TRANSCODER-BASED ADAPTIVE QUANTIZATION

(75) Inventors: Limin Wang; Ajay Luthra, both of San Diego; Paul Moroney, Olivehain, all of CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/642,925

(22) Filed: Aug. 17, 2000

Related U.S. Application Data

(60) Provisional application No. 60/149,267, filed on Aug. 17, 1999.

(51) Int. Cl.[7] .................................................. H03M 7/00
(52) U.S. Cl. ........................................ 341/50; 382/251
(58) Field of Search ............................. 341/50, 51, 52, 341/67, 63; 382/248, 251

(56) References Cited

U.S. PATENT DOCUMENTS

| | | | |
|---|---|---|---|
| 5,537,440 A | * | 7/1996 | Eyuboglu .................. 375/245 |
| 5,790,596 A | * | 8/1998 | Sexton ....................... 375/228 |
| 6,081,295 A | | 6/2000 | Adolph et al. |

FOREIGN PATENT DOCUMENTS

| | | | |
|---|---|---|---|
| EP | 0711077 A2 | 5/1996 | |
| EP | 0739138 A2 | 10/1996 | |
| JP | 11098024 | * 4/1999 | ............ H04N/7/30 |
| WO | WO 95/29561 | 11/1995 | |
| WO | WO 00/21300 | 4/2000 | |

* cited by examiner

*Primary Examiner*—Peguy JeanPierre
(74) *Attorney, Agent, or Firm*—Charles J. Kulas; Townsend and Townsend and Crew, LLP

(57) ABSTRACT

The present invention provides a transcoding architecture and a consumer set-top box with storage capability that is based on the transcoding architecture and capable of operating efficiently in an all-digital environment. In a preferred embodiment, a digital-VIDEO DEVICE employs an MPEG-2 compliant transcoder that includes a simplified cascaded decoder and encoder, and is capable of performing determinable bitrate re-encoding without conducting motion estimation. During recording, the decoder receives and processes a compressed source bitstream, producing a decoded bitstream that includes reconstructed video and preserved motion vectors. The encoder "re-encodes" the decoded bitstream using the preserved motion vectors and performs any applicable bitrate modifications. The re-encoded bitstream is then stored.

25 Claims, 25 Drawing Sheets

APPARATUS AND METHODS FOR TRANSCODER-BASED ADAPTIVE QUANTIZATION

CROSS-REFERENCE TO PRIOR APPLICATIONS

This application claims priority to and hereby incorporates by reference now abandoned U.S. Provisional Patent Application No. 60/149,267 entitled Transcoding for Consumer Set-top Storage Applications and filed on Aug. 17, 1999.

BACKGROUND OF THE INVENTION

1. Field of the Invention

This invention relates generally to digital video. More specifically, the present invention provides an apparatus and method for video recording, playback and other video processing.

2. Discussion of Prior Art

Digital video promises many advantages over traditional analog video, such as greater low-artifact compression, lower generational degradation and compatibility with other digital processing. However, analog video continues to predominate in many consumer applications, largely due to voluminous video data, system costs and a shortage of practical, efficient and easy-to-use capabilities.

Recently, new "digital-VCRs" have emerged that provide prior VCR-like features in a consumer settop box ("STB") to which hard disk recording has been added. Referring now to a prior art video cassette recorder (VCR) in FIG. 1, there is seen a VCR 100 which includes, by way of example only, a processor 102, an MPEG-2 encoder 105, a decoder 109, as well as other off-the-shelf components. During recording, an analog video source signal (e.g. a cable broadcast signal) is digitized in an A-D converter 104, encoded subsequently in a MPEG-2 encoder 105, and then stored via data buffer 108 onto hard disk 109. During playback, stored video is decoded by MPEG-2 decoder 109, converted subsequently back to an analog signal by a D-A converter 110, and then the analog signal as an output is transmitted to a conventional standard definition television ("SDTV," not shown in the drawing).

VCR 100 also enables other features. For example, control data transfer via a modem 101 enables such options as broadcast-guide based viewing, program selection and recording, and usage reporting. Buffered hard disk storage also enables such viewing options as broadcast video pause, review and zoom.

The use of an MPEG-2 encoder also facilitates a conventional-VCR type extended play feature. For example and as best shown in FIG. 2, a typical feed-forward MPEG-2 encoder is illustrated. Compression is provided primarily using macroblock ("MB") based motion-compensated prediction ("MCP") and quantization. MCP reduces bitrate by producing not only complete intra picture data ("I-pictures"), but also lower bitrate predicted and bi-directional (P and B) picture data, including predicted inter-picture motion or "prediction data," generally illustrated as 1, and predicted versus actual-picture or "prediction error" data, generally illustrated as 2. Prediction error data is also converted using a discrete cosine transform ("DCT") 203 and then quantized by quantizer 204. The digital-VCR extended play feature simply increases MB quantization step sizes of new video content according to a user's "record-quality" selection (e.g. high, medium or low quality), thereby further reducing its bitrate and resultant storage requirements.

Unfortunately, current digital-VCRs are directed at analog broadcast and display technologies, and are not compatible with a compressed video source. Current digital-VCRs are also prohibitively expensive for many consumers, due in part to the high cost of MPEG-2 encoders and system complexity, and are not operable with emerging compression, display formats or other capabilities. Among further deficiencies, while extended play mode reduces storage requirements for new content, it does not assure that a user's goal (e.g. fitting a new program onto the hard disk) will be achieved.

Accordingly, there is a need for a digital video recording and playback system which is capable of operating in an all-digital broadcast environment. There is further a need for such a system that also provides greater efficiency and predictability, greater adaptability and easy-to-use, and determinable reduced bitrate storage at lower cost than that required by current hard disk enabled STBs.

SUMMARY OF THE INVENTION

In one embodiment of the present invention there is provided a digital video processing architecture which is capable of operating efficiently in an all-digital input (e.g. broadcast) environment and better enabling features including those currently associated with digital video devices. The embodiment also enables low cost determinable accommodation and/or modification of bitrate, quality and/or other aspects of a received video source, preferably in conjunction with providing such features.

In another embodiment of the present invention, there is provided a transcoder architecture for processing a compressed source bitstream and enabling conversion of the source bitstream into a second bitstream having a determinable bitrate or quality. There is also provided a low-cost, low-computation and extensible transcoder capable of determinable bitrate modification without performing motion estimation. In another aspect of the present invention, there is provided a digital-video device capable of operating in an all-digital environment. There is also provided a cost-efficient digital-video device that enables determinable bitrate, quality and format conversion. Among still further aspects of an embodiment of the present invention, the aforementioned features are provided with reduced computational requirements which are susceptible to hardware and/or software implementations under effective user and/or automatic (e.g. hardware and/or programmatic) control.

In also another embodiment of the present invention, a digital-VIDEO DEVICE employs an MPEG-2 compliant transcoder that includes simplified cascaded decoder and encoder functionality, and is capable of performing determinable bitrate re-encoding and other processing without conducting motion estimation. During recording, the decoder receives and processes a compressed source bitstream to produce a decoded bitstream that includes reconstructed video and preserved motion vectors. The encoder "re-encodes" the decoded bitstream using the preserved motion vectors and performs any applicable bitrate modifications. The re-encoded bitstream is then stored. During playback, the transcoder-based decoder, or an additional decoder, decodes a stored bitstream, which is then output in digital and/or analog form. Various extended play, re-recording and other features are also provided.

Another embodiment of the present invention provides a method for determining an optimal re-encode quantization parameter, comprising:

receiving a decoded quantization parameter, Q1, of a bitstream portion;

receiving a re-encode quantization parameter, Q2, of the bitstream portion;

comparing Q1 to Q2; and selecting Q2 as the optimal re-encode quantization parameter if Q2 is greater than Q1, and otherwise selecting Q1 as the optimal re-encode quantization parameter.

Another aspect of the present invention includes a method for forming a re-encoded bitstream portion, comprising:

(a) receiving a compressed bitstream portion having a first quantization parameter, Q1;

(b) initiating decoding of the compressed bitstream portion to produce the first quantization parameter, Q1, and an inverse quantization output;

(c) initiating re-encoding of the decoded bitstream portion to form a second quantization parameter, Q2, and a quantization input;

(d) determining that Q2 is less than Q1;

(e) determining that the inverse quantization output is substantially equal to the quantization input;

(f) copying the compressed bitstream portion to produce a re-encoded bitstream portion; and (g) reconstructing the bitstream portion to form a reconstructed bitstream portion and storing the reconstructed bitstream portion in a frame buffer.

A further embodiment of the present invention comprises a computer readable storage medium storing program code for causing a processing system to perform the steps of:

receiving a decoded quantization parameter, Q1, of a bitstream portion;

receiving a re-encode quantization parameter, Q2, of the bitstream portion;

comparing Q1 and Q2; and selecting Q2 as the optimal re-encode quantization parameter if Q2 is greater than or equal to Q1, and otherwise selecting Q1 as the optimal re-encode quantization parameter.

A transcoder is also provided in accordance with another embodiment of the present invention. The transcoder comprising:

a decoder for producing a coding parameter of a received bitstream portion; and an encoder coupled to the decoder for producing a re-encode parameter corresponding to the received bitstream portion, comparing the re-encode parameter to the coding parameter and copying the received bitstream portion to re-encode bitstream according to a predetermined determined correspondence between the parameters.

Another aspect of the transcoder includes:

means for receiving a decoded quantization parameter, Q1, of a bitstream portion;

means for receiving a re-encode quantization parameter, Q2, of the bitstream portion;

means for comparing Q1 and Q2 and means for selecting Q2 as the optimal re-encode quantization parameter if Q2 is greater than Q1, and otherwise selecting Q1 as the optimal re-encode quantization parameter.

Further embodiment of the present invention includes a method for forming a re-encoded bitstream portion, comprising:

(a) receiving a compressed bitstream portion having a first quantization parameter, Q1;

(b) initiating decoding of the compressed bitstream portion to produce the first quantization parameter, Q1, and an inverse quantization output;

(c) initiating re-encoding of the decoded bitstream portion to form a second quantization parameter, Q2, and a quantization input;

(d) determining that Q2 is less than Q1;

(e) determining that the inverse quantization output is unequal to the quantization input;

(f) determining that the bitstream portion corresponds to a B-picture;

(g) copying the compressed bitstream portion to produce a re-encoded bitstream portion; and (h) reconstructing the bitstream portion to form a reconstructed bitstream portion and storing the reconstructed bitstream portion in a frame buffer.

The present invention in another aspect includes a method for disposing of spare bits resulting from transcoding, comprising:

receiving a decoded quantization parameter, Q1, of a bitstream portion;

receiving a re-encode quantization parameter, Q2, of the bitstream portion;

determining that Q1 is greater than Q2;

selecting Q1 as a replacement re-encode quantization parameter; and passing spare bits resulting from the replacement to another bitstream portion.

The foregoing provisions along with various ancillary provisions and features will become apparent to those skilled in the art as the following description proceeds, are attained by is novel system and methods, a preferred embodiment thereof shown with reference to the accompanying drawings.

DETAILED DESCRIPTION OF THE PREFERRED EMBODIMENT

The present invention provides a transcoder architecture and other aspects that are preferably used to enable capabilities of prior analog and digital VIDEO DEVICEs, as well as other digital VCR capabilities; such capabilities are further enabled compatibly, efficiently and adaptively with digital and/or analog video sources. The invention is preferably implemented as an advanced settop box or "STB" and in accordance with MPEG-2. Those skilled in the art will appreciate, however, that aspects of the invention are also applicable in a more separated or integrated manner to various other implementations, systems, and compression/reconstruction specifications and/or techniques as well.

Figure 3:
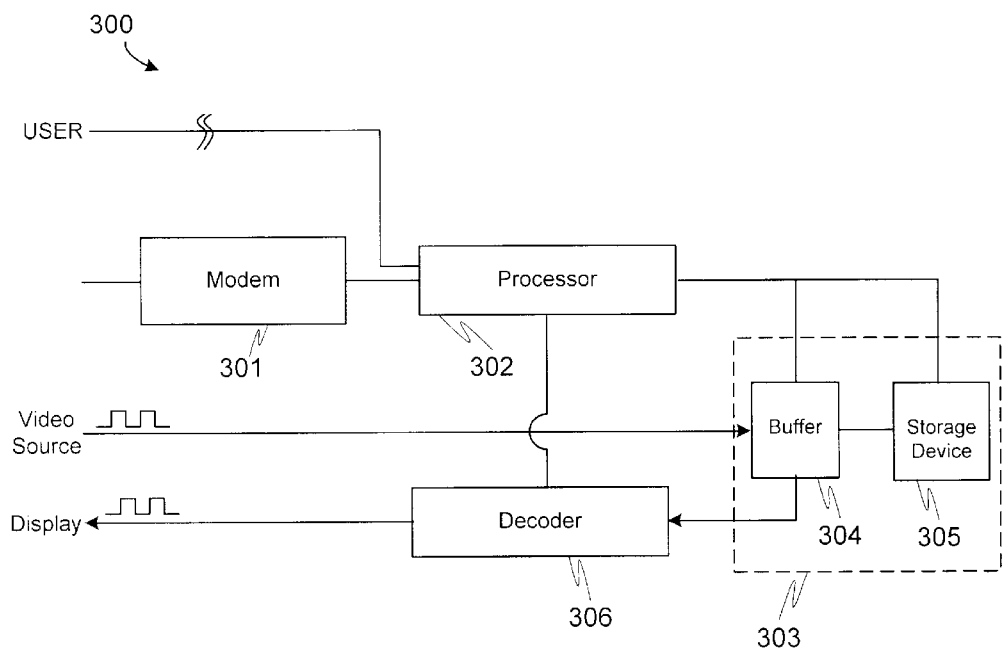
FIG. 3 is a flow diagram illustrating an exemplary digital-VIDEO DEVICE that mimics conventional-VCR behavior, but using a pre-compressed video source.

In providing a digital video product that receives a compressed video source and performs VCR-like features, a more apparent approach would be to simply mimic conventional-VCR behavior. An example of such a product is illustrated in FIG. 3. During recording, VIDEO DEVICE 300 stores a received pre-compressed source bitstream directly to video storage (i.e. via buffer 304 onto hard disk 305). During playback, stored video data is decoded using an off-the-shelf decoder 306 and then output to a digital display system. Thus, both operations are efficiently conducted in a digital environment, but in a similar manner as with conventional-VCR recording and playback of analog video. VIDEO DEVICE 300 also enables other advantages including low complexity and initial system cost, while providing almost all features of prior analog and digital VCRs.

However, the bitrates of received compressed video bitstreams can vary substantially (e.g. for standard definition MPEG-2, from about 1.5 to 15 Mbps), and VIDEO DEVICE 300 lacks any bitrate-modification capability. As a result, a consumer using such a device would experience storage capacity problems when attempting to record movies and other new video content. Further, assuring a given content record time would require sufficient hard disk capacity to accommodate a corresponding bitstream at its maximum potential bitrate (e.g. at least a full-length movie at 1.5 Mbps); thus, the hard disk might be unnecessarily oversized and costly for storing lower-bitrate content. The lack of bitrate reduction capability might also prevent storage of high bitrate content in its entirety even though the content would otherwise have fit if such capability had been provided.

Figure 4:
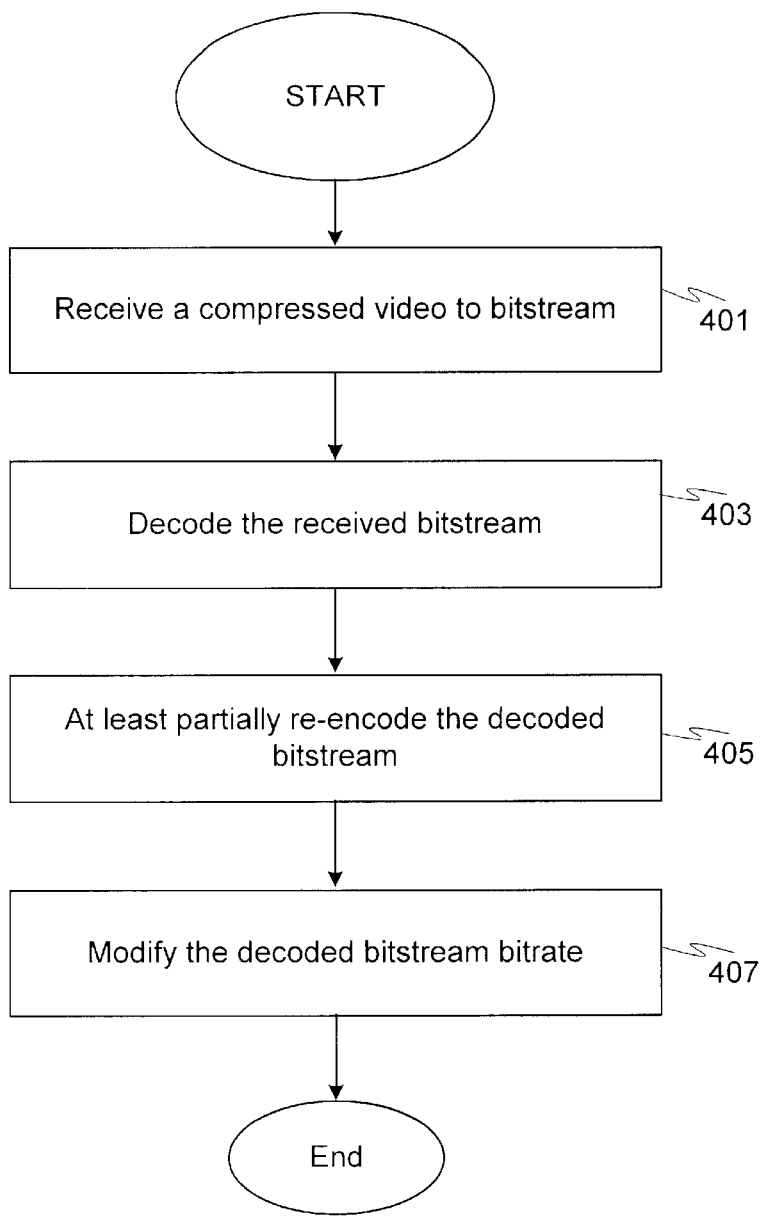
FIG. 4 is a flowchart broadly illustrating a transcoding method according to an embodiment of the invention.

Alternatively, a transcode architecture has also been discovered that solves the above problems, provides additional features and—despite its increased component count—can actually be more cost-effective, among its other advantages. Note that the term "transcoding" is expanded herein beyond its typical reference to coded-domain conversion operations, such as display format conversion. The term is extended to include processing that still receives and outputs compressed data, but also performs intermediate processing across more than one domain. More specifically, present transcoding is preferably conducted according to the broad method of FIG. 4, in which a compressed (e.g. MPEG-2) bitstream is received (step 401), decoded (step 403) and at least partially re-encoded (step 405). Bitrate modification is also optionally conducted, as in step 407.

Figure 5:
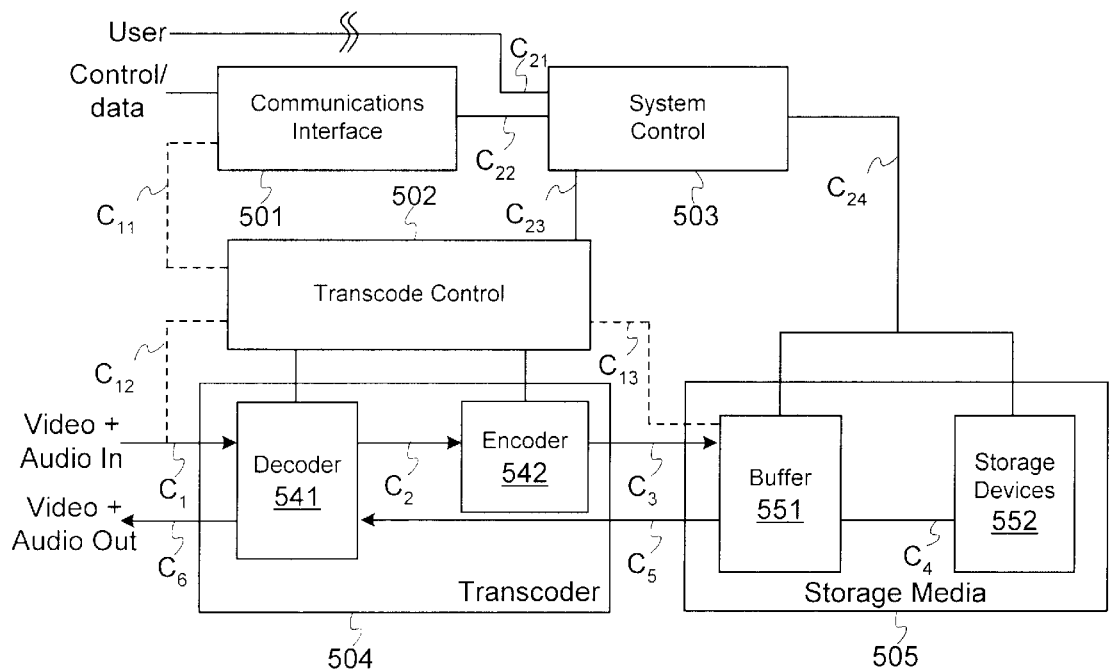
FIG. 5 is a flow diagram broadly illustrating a digital-VIDEO DEVICE that utilizes a generic transcoding architecture according to an embodiment of the invention.

An exemplary digital-VIDEO DEVICE utilizing the present broad or "generic" transcode architecture is broadly illustrated in FIG. 5. As shown, VIDEO DEVICE 500 is implemented as an advanced-STB comprising coupled elements including communications interface 501, system control 502, transcode control 503, transcoder 504 and storage media 505. Transcoder 504 further includes MPEG decoder 541 and encoder 542, and storage media 505 further includes buffer 551 and one or more fixed and/or removable storage devices 552. Any number of control devices such as 502 and 503 can be used.

Basic VIDEO DEVICE 500 record and playback operations are provided using transcoder 503 as follows. During recording, an encoded source bitstream is decoded by decoder 541 and then (at least partially) re-encoded by encoder 542 to form a re-encoded bitstream; the re-encoded bitstream is then stored via buffer 551 onto storage device 552 (e.g. a hard disk). Encoder 542, in addition to re-encoding, also performs optional bitrate modifications according to decoder output and user and/or automatic controls. During playback, stored video data is decoded by decoder 532 (or a further decoder which is not shown) and then output. Control of these and other VIDEO DEVICE 500 operations is preferably initiated by system control 502 in response to user input, communications interface input, bitstream sensing, transcode status (via connection C23), and/or storage medium status/data (via C24), and can be effectuated in an otherwise conventional manner using control signals and/or data (some examples of which will be discussed).

Figure 1:
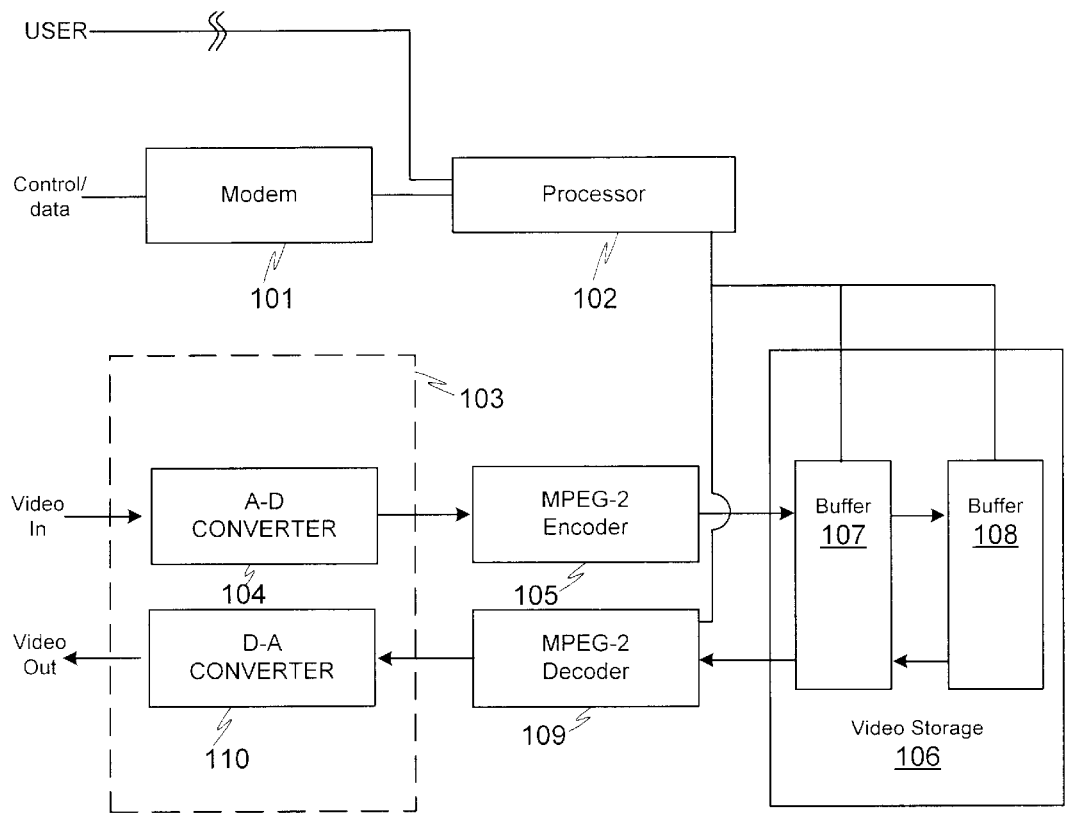
FIG. 1 is a flow diagram illustrating an example of a conventional digital-VCR.
Figure 2:
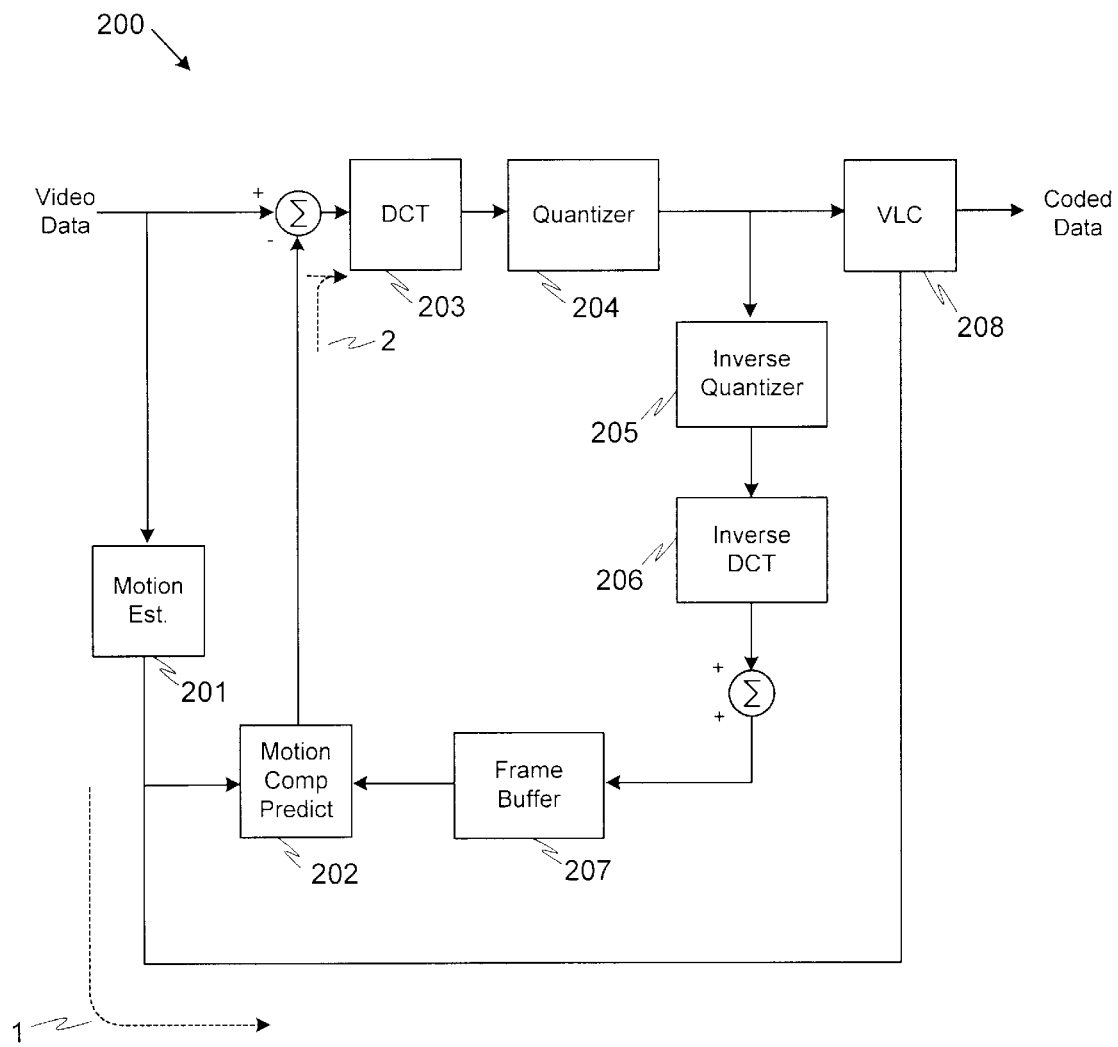
FIG. 2 is a flow diagram illustrating a conventional feed-forward MPEG-2 encoder.

VIDEO DEVICE 500 also enables various other features, as well as those of digital-VCR 100 (FIG. 1). For example, in addition to conventional extended play options (discussed below), the bitrate of previously recorded content can also be reduced to release storage capacity for new content. Such "re-recording" can, for example, be conducted by decoding a stored content portion (received via connection C5), re-encoding the decoded content with a reduced bitrate (via C2), and re-storing the re-encoded content (via C3). Previous content (i.e. or portions thereof) can also simply be selected and deleted. Encoder 533 can further optionally include a post-preprocessor capable of performing encoder pre-processing, conversion, post-processing and/or other bitstream modifications (e.g. see FIG. 21, which is taken from FIG. 6 of the above-mentioned prior application). Transcoder 503 can also be selectively bypassed where no bitstream processing is then required, for example, using transcode control 531 (via C10 and C11) or a bypass-enabled decoder and encoder.

VIDEO DEVICE 500 is also extensible and readily modifiable to provide still further features. For example, A-D and/or D-A converters can also be added or incorporated as part of transcode control 531; the converters can then be utilized or bypassed (e.g. via connections C12 and C13, bypass enabled converters, etc.) according to user input, remote-source control signals and/or signal sensing controls, thereby enabling user-selected and/or automatic analog I/O compatibility. Communications interface 501 can also be used to transfer code/data (e.g. video) to and/or from external sources and destinations (e.g. the internet). However, support of bitstreams incorporating varying compression/format techniques would require a type flag, bitstream parsing and/or other compression/format-type identification during recording or (if stored directly) during re-recording; modifiable and/or selectable bitstream-to-decoder compression/format matching might also be required. Removable and/or remote storage media can also be utilized, again subject to compression and/or other format type identification and matching where more than one type is to be supported.

Figure 6:
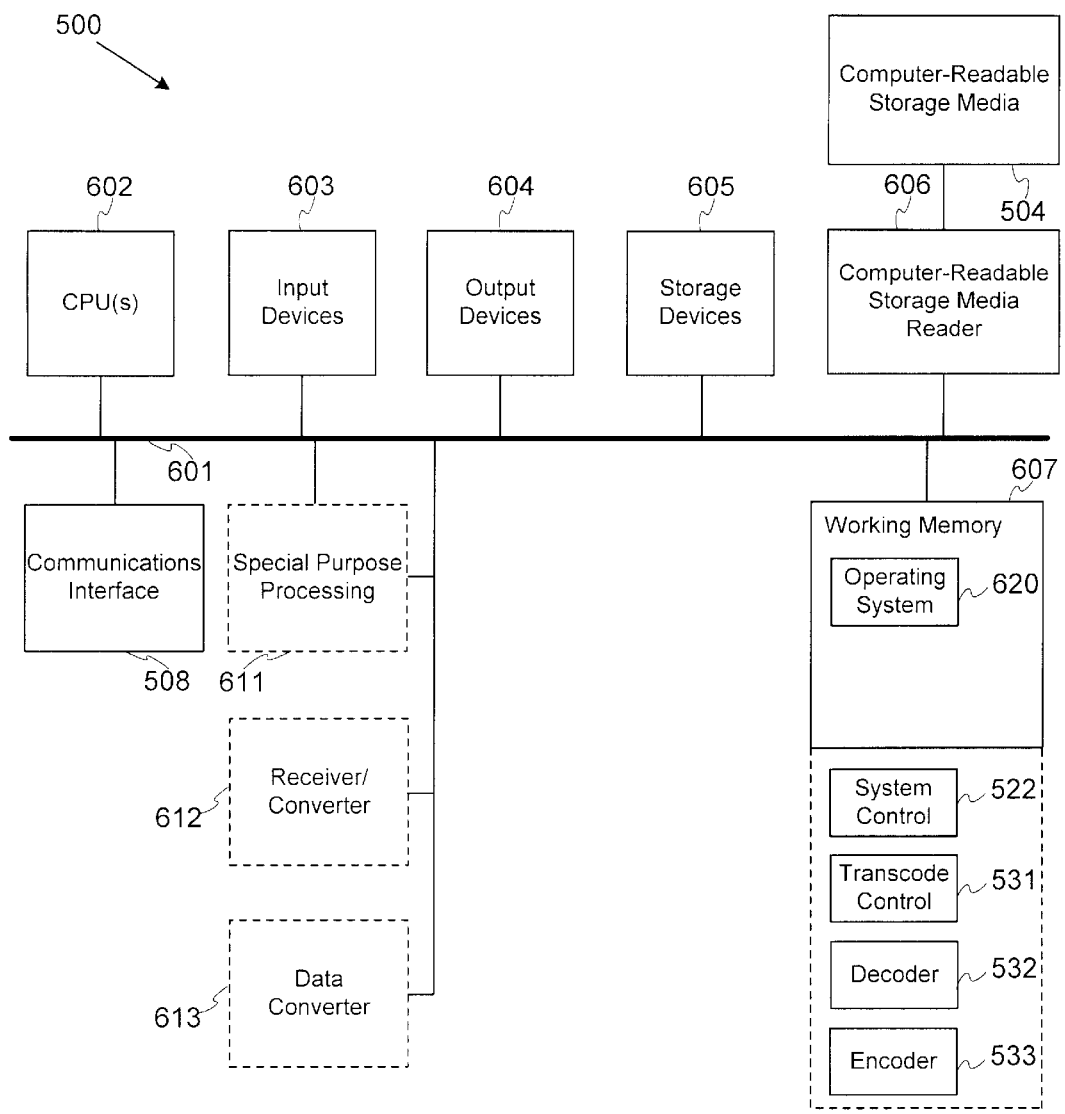
FIG. 6 is a flow diagram broadly illustrating a processing system based digital-VIDEO DEVICE according to an embodiment of the invention.

VIDEO DEVICE 500 is also adaptable to a variety of implementation approaches according to system/application requirements. However a processor-based system such as that broadly illustrated in FIG. 6 is found to be especially flexible; this is particularly beneficial in an advanced STB, where remote reporting, polling, updating, appliance communication and/or other features might be utilized, added or modified. A software processing approach is also ideal for playback of stored video, allowing great flexibility in the production of trick effects, such as fast forward, pause, slow scan and so on, as consumers have come to expect of a VCR, as well as other features.

VIDEO DEVICE 600 comprises conventional processing system hardware elements electrically connected via bus 601 including processor 602, input devices 603, output devices 604, storage devices 605, computer-readable storage media reader 606, memory 607 and communications interface 508. Computer-readable storage media reader 606 (e.g. memory and/or storage device interface) is further connected to computer-readable storage media 504. VIDEO DEVICE 600 also comprises software elements including operating system ("OS") 618 and system control 502.

The inclusion and nature of certain other elements is particularly system/application dependent. For example, further hardware elements can include special-purpose processing 611 (e.g. digital signal processing, co-processor(s), etc.), an audio encoder/decoder (e.g. Dolby Digital®), other media device support (e.g. broadcast-source receiver/converter, CD, DVD, HDVD, magnetic tape, etc.) and/or data converters/drivers (e.g. A-D, D-A, flat-panel display, etc.), among others.

Additionally, the specific transcoder implementation utilized may well determine whether transcode control 503, decoder 541 and/or encoder 542 are implemented in software or hardware. As discussed, transcode control is subject to many permutations, some of which might include hardware elements, such as data converters. It is also likely that a "completely re-encoding" transcoder will not currently permit inexpensive software implementation, while a "partially re-encoding" transcoder will (examples of which are given below). Further, while a current transcoder preferably operates according to MPEG-2, accommodation of emerging and proprietary standards (e.g. MPEG-4, H.264, etc.) and/or modifiable/downloadable tools (e.g. in supporting varying compression/formats) would each suggest, but not necessarily require software implementations.

It will be apparent to those skilled in the art that still further variations are contemplated and within the scope of the present invention. For example, given processor and other component technological advancements, hardware elements may be embodied in software or a combination of hardware and software. Similarly, software elements may be embodied in hardware or a combination of hardware and software. A further example is that the use of conventional networking technologies enables the further use of internal and/or external code/data originations and/or destinations and related capabilities (e.g. applets, remote control, up/download, etc.). Various processors and programming environments can also be similarly utilized, among yet other examples.

Figure 7:
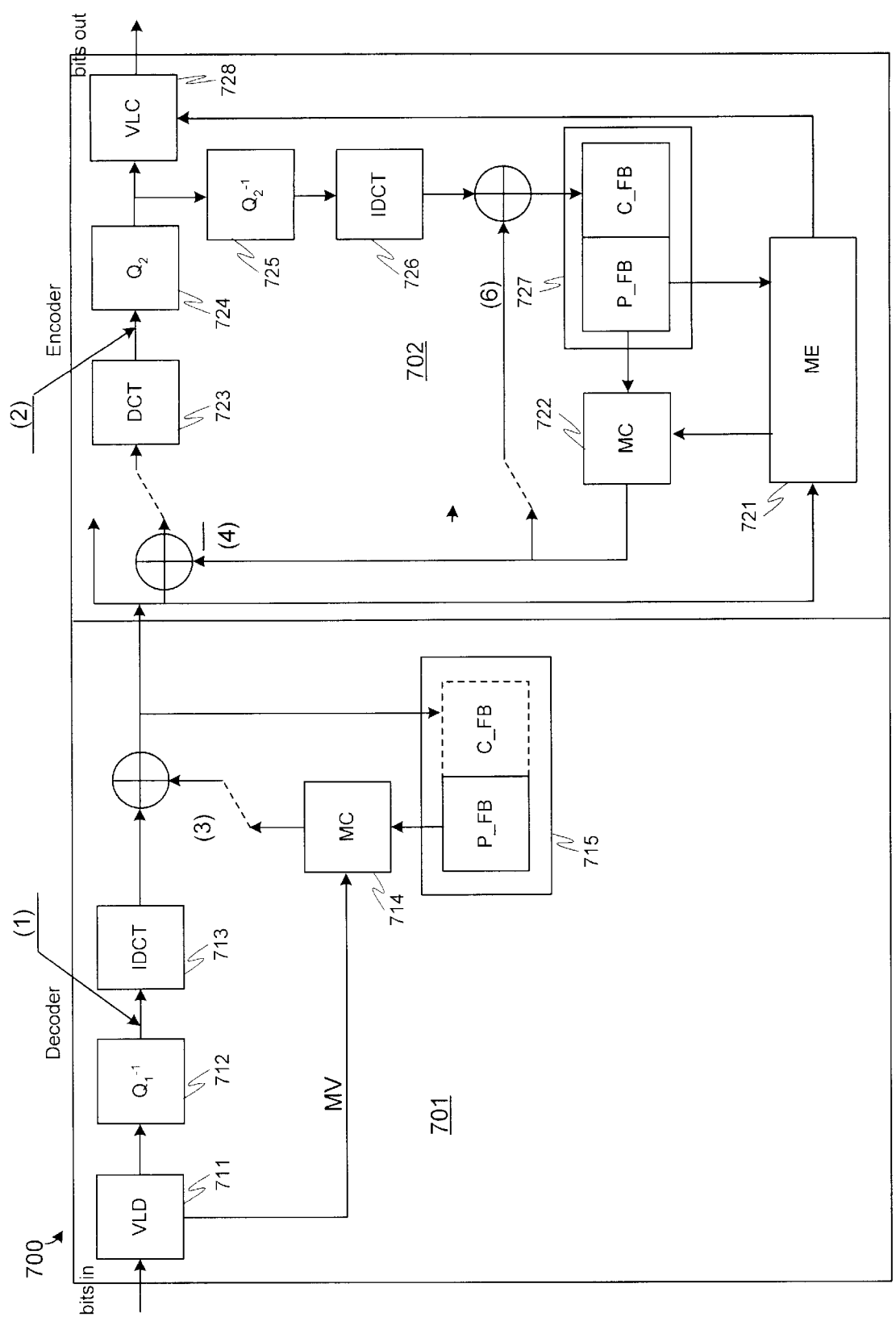
FIG. 7 is a flow diagram illustrating a complete re-encode transcoder utilizing a cascaded MPEG decoder and encoder according to an embodiment of the invention.

Referring now to FIG. 7, FIG. 7 illustrates an example of how transcoder 503 of FIG. 5 can be more particularly configured in a largely straight-forward manner as a completely re-encoding transcoder. Transcoder 503 includes an MPEG-2 decoder 541 and encoder, which are arranged in a cascaded decoder-encoder 542 configuration. It should be noted that, unlike the usual coder-decoder or "codec" configuration used in bitstream transmission and the prior digital-VCR 100, the present transcoder configuration does not require encoder pre-processing or decoder post-processing stages. As was taught by the above-mentioned prior application, however, a "post-preprocessor" can also be added for providing additional capabilities; pre-decode and/or post-encode processing can also be optionally utilized (e.g. for further bitstream refinement).

Transcoder 701 operation is most easily understood in terms of basic VCR-like features. During recording, the pre-compressed source bitstream is reconstructed by decoder 701 in a conventional manner. That is, variable length decoder 611 parses the bitstream and separates bitstream elements, the resultant prediction error data being further processed by inverse quantizer 712 and inverse DCT 613, and motion vectors ("MV") being processed by motion compensated predictor 714 in accordance with frame data stored in frame buffer 715. A resultant decoded bitstream is then transferred to encoder 702, which performs bitstream modifications (if any) and re-encodes the decoded bitstream to produce a new, re-encoded bitstream. (Playback and re-recording are conducted by decoder 701 and encoder 702 respectively in the manner already discussed with reference to FIG. 5.)

Re-encoding is performed in a manner largely consistent with conventional encoding. During conventional MPEG encoding, for example, macroblock-based quantization parameters are determined and supplied to quantizer 724, which performs quantization, and the parameters are embedded into the encoded bitstream during a later encoding stage. A subsequent decoder decodes, but cannot modify the parameter set, and the parameters are discarded as they are used in macroblock ("MB") reconstruction.

Consistently, each bitstream-embedded MB quantization parameter Q1 is received by decoder 701, used in performing reconstruction and then discarded without the ability to perform bitrate modifications. Encoder 702, however, forms a new MB quantization parameter Q2 during encoding which is modifiable (e.g. for providing extended play and/or other VIDEO DEVICE 500 features).

Figure 8:
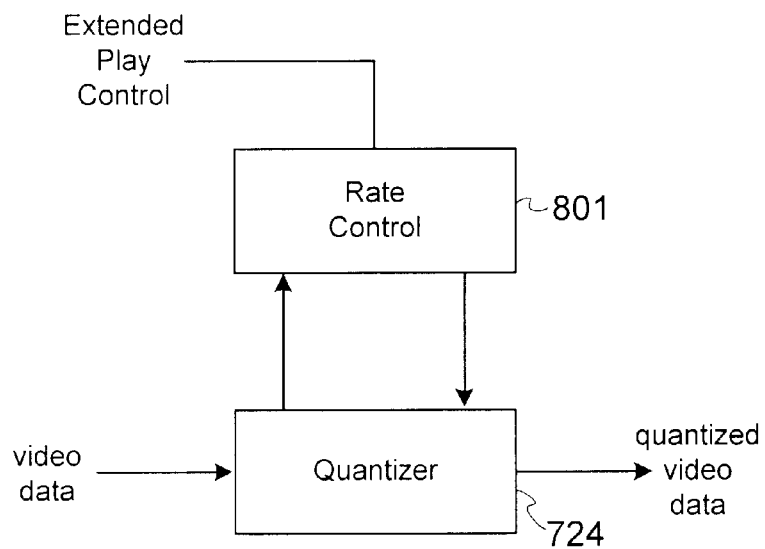
FIG. 8 is a flow diagram illustrating an apparatus for conducting bitrate modification according to an embodiment of the invention.
Figure 21:
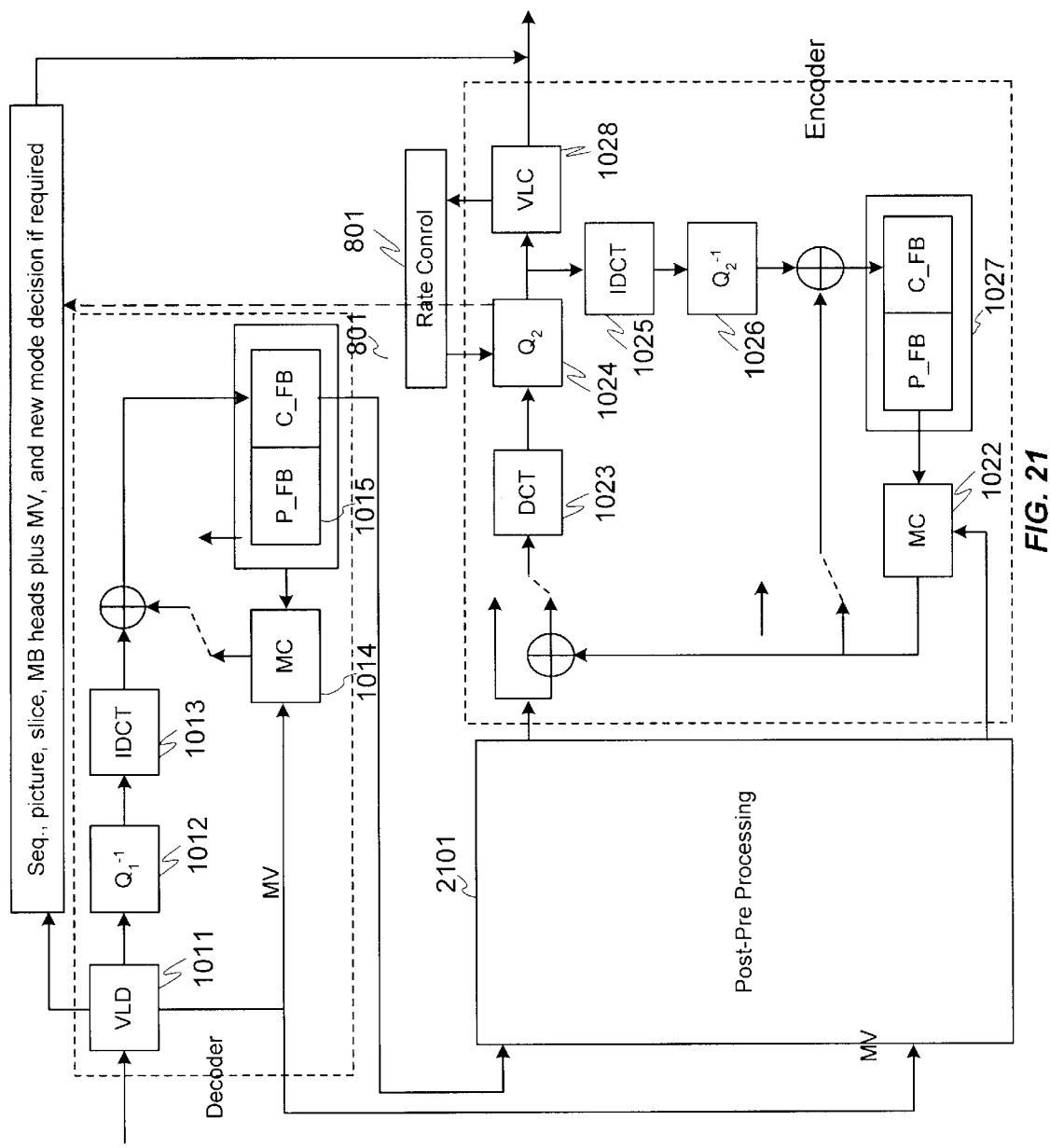
FIG. 21 is a flow diagram illustrating a partial re-encode transcoder having a post-preprocessor according to an embodiment of the invention.

As shown in FIG. 8 with reference to FIGS. 5 and 21, bitrate modification is conducted by rate control 801, which receives Q2 and an extended play ("EP") control signal indicating an extended play option to be applied. The control signal can, for example, be an EP-type indicator used by rate control 801 to select a stored quantization modification amount or an actual modification amount; a control indicator can also be used by modifier 801 to otherwise determine an appropriate Q2 modification, for example, to indicate an amount of continuously variable absolute or relative modification to be implemented. Rate control 801 (e.g. rate control 2101 of FIG. 21, transcode control 531 of FIG. 5, or a further modifier) determines the applicable modification, modifies Q2 and returns the modified Q2 to quantizer 724. (Note that other modification implementations, such as that of conventional digital-VCRs, can also be utilized either alone or in conjunction with other processing.)

For example, let us presume a received source bitstream having a bitrate of 15 Mbps or MPEG-2 main level main profile and a storage-enabled advanced STB having a 6 GB internal hard disk with no external storage. A consumer may choose from various options. Consumer selection of one of three quality modes (e.g. high, medium and low) can initiate real-time transcoding of the source bitstream to one of three corresponding bitrates (e.g. 6 Mbps, 3 Mbps or 2 Mbps). In this case—and assuming the same quality mode is always used—the consumer can store about 2.2 hours of video at high quality, 4.4 hours at medium quality and 6 hours at low quality.

Note, however, that the transcoding architecture is also capable of variable bitrate compression, so that it is not necessary to code at exactly 6 Mbps, 4.4 Mbps or 2.2 Mbps, and any number of other modified bitrate values can also be used. Thus, for example, a capacity-fitting mode can also be provided, whereby the source bitstream bitrate is modified to "fit" within available space—within reasonable compression limits. (Real-time modification also enables a "test" mode in which a source modification is output for display at a static or variable potential bitrate, thereby not requiring extensive amounts of memory; thus a user may be able to store more of a source video signal at a "user pre-approved" reduced bitrate.) These and other options are also enhanced by the ability to re-encode. For example, the bitrate of selected already-recorded content (or content portions) can similarly be reduced to free storage for new content.

Further, a source and/or target bitrate can be averaged over the course of a movie, thereby enabling bitrate distribution and often far better quality than an equivalent fixed bitrate (e.g. a 2 hour DVD movie stored at an average bitrate of 5 Mbps can have peaks as high as 10 Mbps, when a scene demands it). Transcoding even enables real-time bitrate modifications that are continuously adjustable; however, a consumer may not yet be comfortable with, for example, a continuous rate controller, such as a quality dial, being so different from the VCR experience of the last 30 years.

Nevertheless, despite the benefits of complete re-encode transcoding, a concern exists as to its relatively high cost, due largely to present encoder pricing. In addition, conventional encoders are very complex, which currently renders them less susceptible to real-time software implementations using economically priced processors and/or other processing system elements.

Complete re-encode transcoder complexity can be significantly reduced if the source bitstream picture types (I, P or B) can be maintained in a resulting re-encoded bitstream. It is found, however, that not only can the picture types be maintained, but maintaining the picture types also enables the temporal processing (intra, inter, forward, backward or interpolative) to be maintained as well. It is also possible to maintain the code modes for the macroblocks ("MBs") in a picture. Further, a high degree of similarity has been found to exist between the source and reconstructed video that enables the decoded motion vector fields to be preserved during decoding and then re-used during re-encoding.

Figure 9:
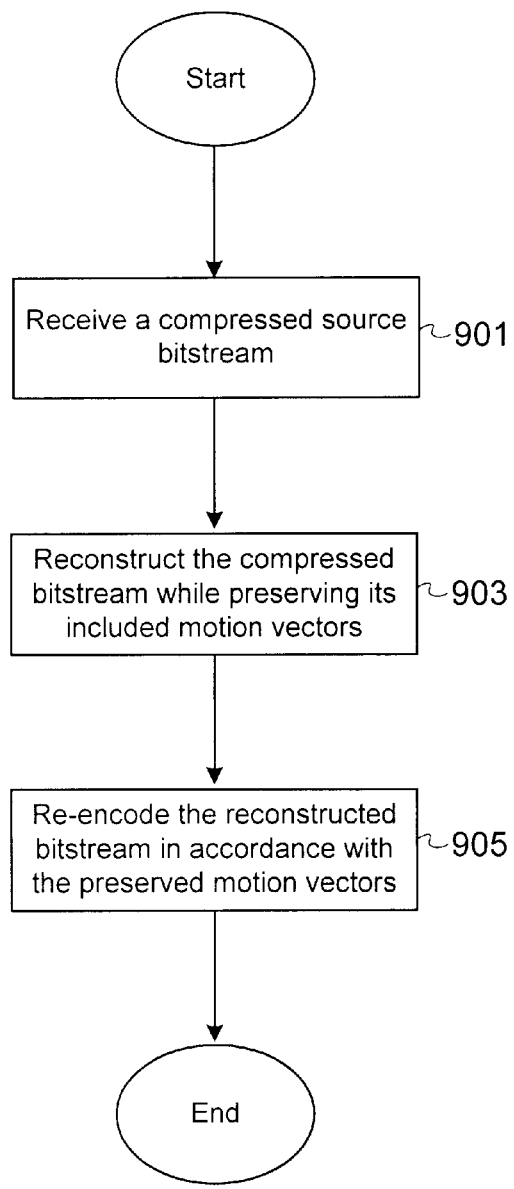
FIG. 9 is a flowchart broadly illustrating a partial re-encode transcoding method according to an embodiment of the invention.

The ability to re-use motion vector fields is particularly significant since it indicates that motion estimation -the most complex and expensive operation in the cascaded encoder— is no longer necessary and can be removed without adversely affecting other capabilities. Accordingly, as illustrated in FIG. 9, a further transcoding method according to the invention broadly includes receiving a compressed source bitstream (step 901), reconstructing the compressed bitstream while preserving its motion vectors (step 903) and re-encoding the reconstructed bitstream in accordance with the preserved motion vectors (step 905).

Figure 10:
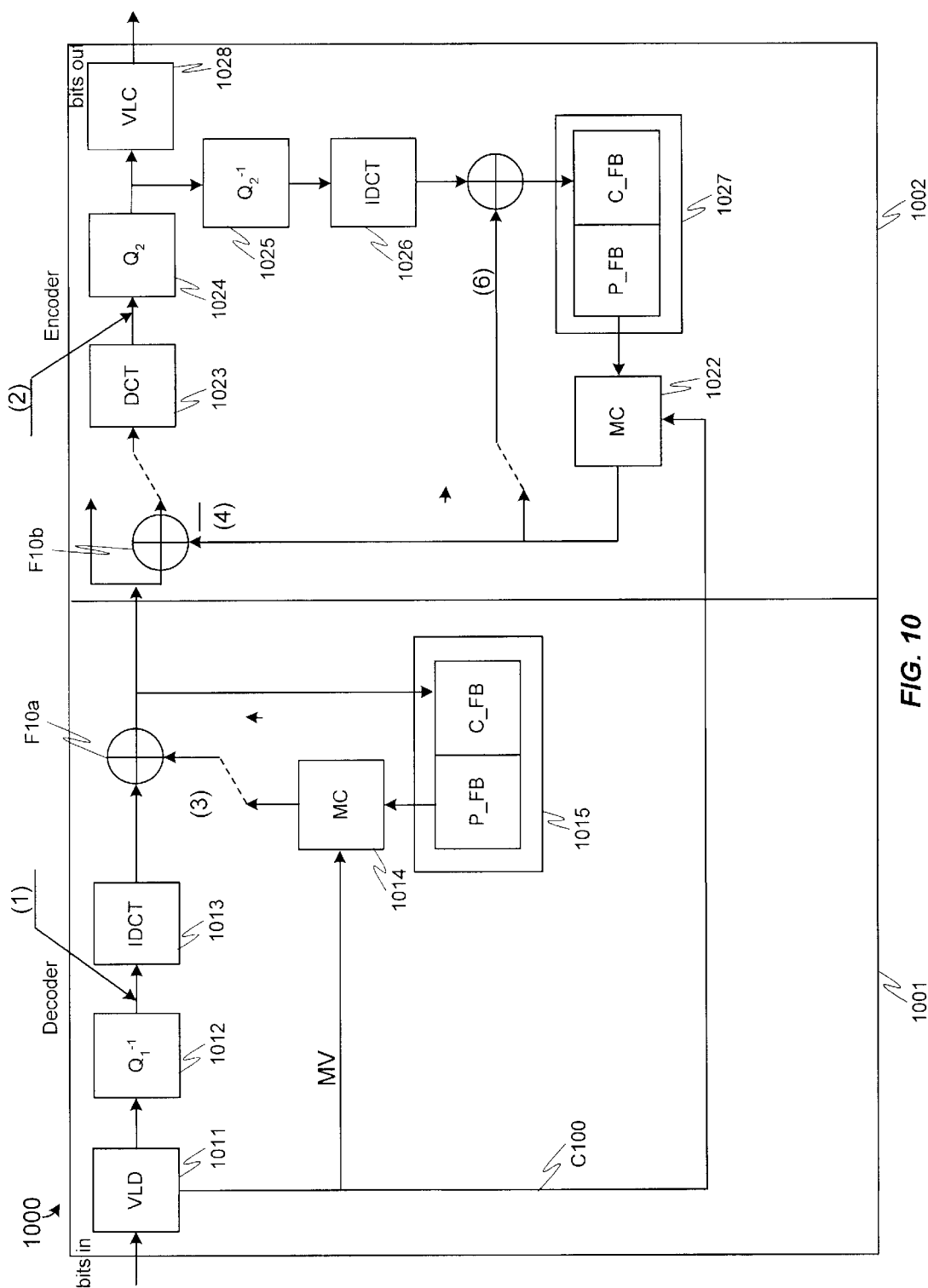
FIG. 10 is a flow diagram illustrating a cascaded-based partial re-encode transcoder according to an embodiment of the invention.

An example of the generic transcoder architecture that performs "cascaded-based" partial re-encoding without motion estimation is broadly illustrated in FIG. 10. As shown, transcoder 1000 is configurable and operable in a similar manner as with cascaded transcoder 700 of FIG. 7. During transcoding, decoder 1001 receives and reconstructs a compressed source bitstream as with complete re-encode transcoder 700. However, the reconstructed motion vector fields for successive MBs are not wholly discarded after their use in respective MB reconstruction, but are instead preserved and transferred via added connection C100 from decoder VLD 1011 to encoder MC 1022. MB re-encoding is then conducted by encoder 1002 using the corresponding preserved (rather than new, encoder-determined) motion vector fields. Additionally, transcoder 1000 can be integrated within a system in substantially the same manner as transcoder 700, for example, as a digital-VCR element (e.g. as already discussed).

Figure 11:
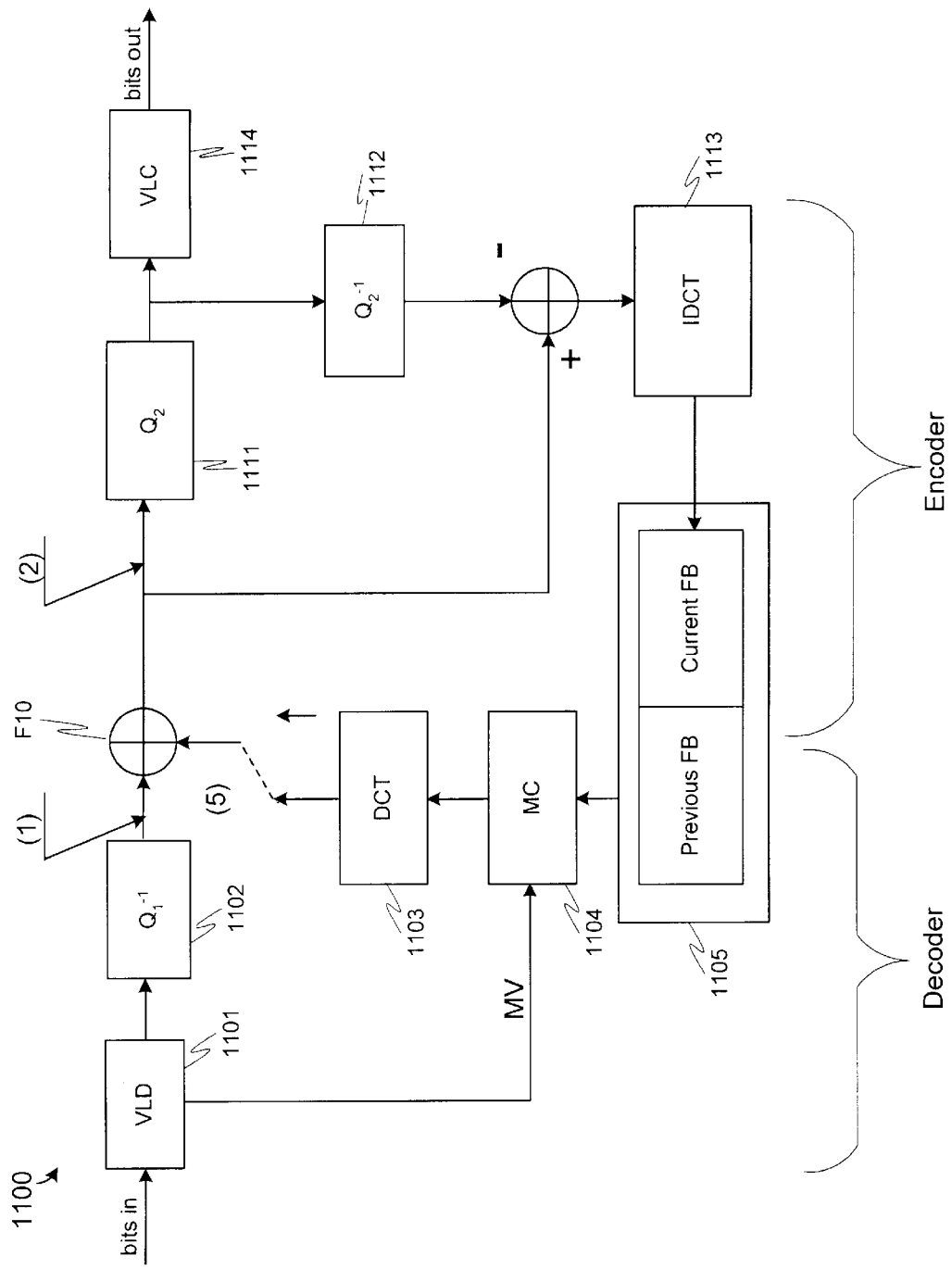
FIG. 11 is a flow diagram illustrating a simplified partial re-encode transcoder according to an embodiment of the invention.

A further "simplified transcoder" that is also capable of partial re-encode transcoding is illustrated in FIG. 11. Transcoder 1100 is formed according to the observation that certain elements are common to both decoder 1001 and decoder 1002 of FIG. 10. While not wholly redundant, such elements can nevertheless be combined and the resulting operational differences can further be accommodated, for example, as is next discussed. More specifically, functions F10a and F10b, MCs 1014 and 1022, and frame buffers 1015 and 1027 (FIG. 10) have been combined to form function F11, MC1 104 and frame buffer 1105 (FIG. 11) respectively.

Accommodation of the operational variations imposed by the above simplification might at first seem contrary to system efficiency (e.g. as either or both partial re-encode transcoders can be used in a system). However, the benefits achieved are considered a worthwhile tradeoff. For example, while digital processing is able to achieve low degradation with repeated processing, each process can nevertheless introduce some processing artifacts. Thus, in this sense, removing motion estimation and then further removing redundant processing can each contribute to improved picture quality or resolution in general. Among other complexity reduction advantages, reducing complexity also reduces cost by further facilitating the replacement of discrete components with software.

Figure 12:
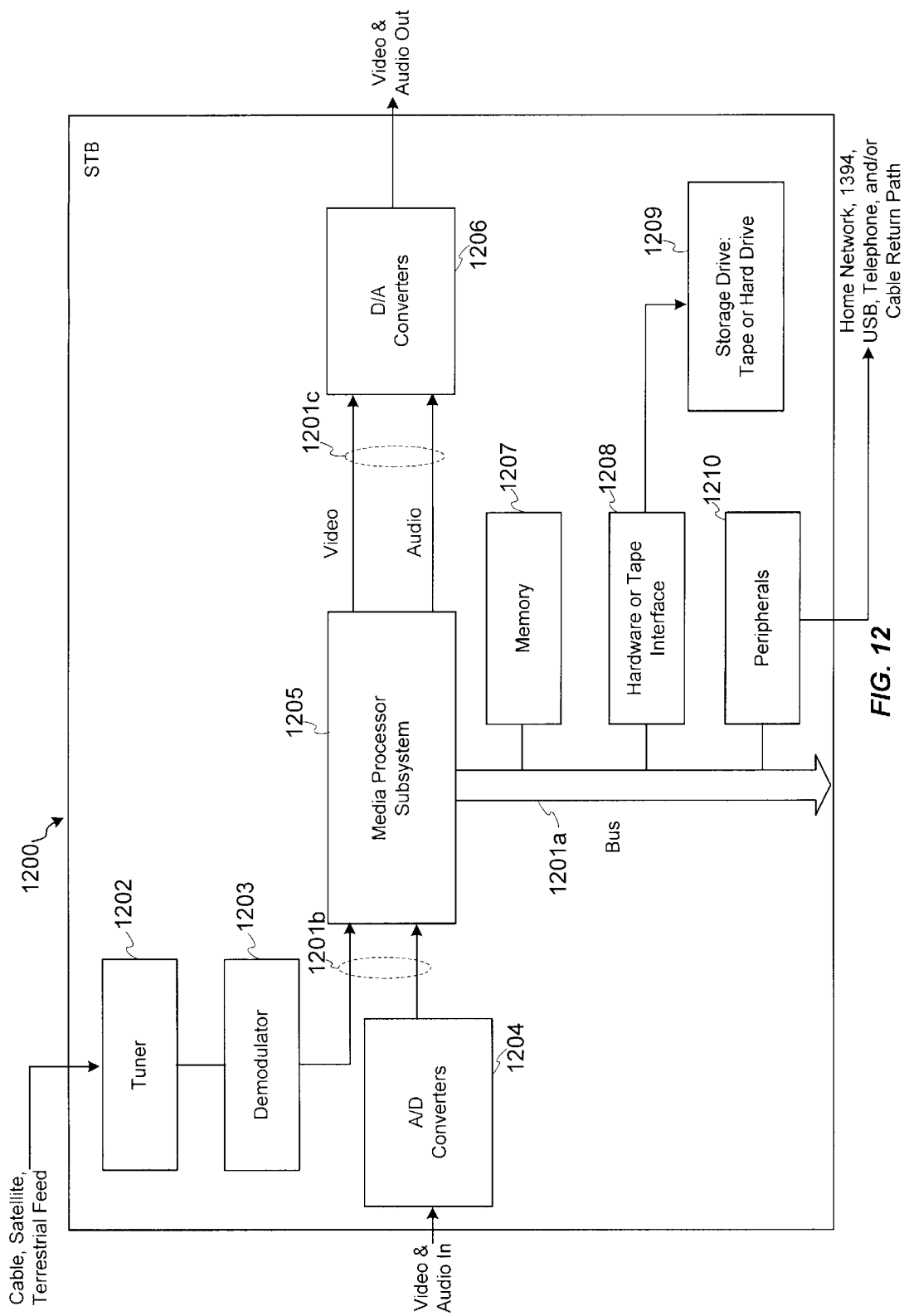
FIG. 12 is a flow diagram illustrating, in greater detail, a processing system based digital-VIDEO DEVICE according to an embodiment of the invention.

FIG. 12, for example, illustrates a more specific example of an advanced STB with digital-VCR capabilities in which transcoding and control operations are implemented in software. For purposes of this example, bypass-enabled data converters 1204 and 1206 are explicitly indicated, as are more specific additional processing elements used in receiving broadcast television (e.g. tuner 1202 and demodulator 1203 are provided for use receiving cable-based programming). Tuner 1202 and demodulator 1203 are also connected directly rather than via bus 1201a, thereby reducing potential throughput and/or conflict issues between such front end elements and other back-end processing-related elements. Also, for clarity, the input/output devices and a communications interface depicted in FIG. 6 are combined simply as "peripherals" 1210. Applicable code and data buffers can be implemented in a conventional manner using memory 1207 and storage drive 1209, and a media processor subsystem is utilized as a processor to provide optimal media-application performance (e.g. for video and graphic display).

Figure 13:
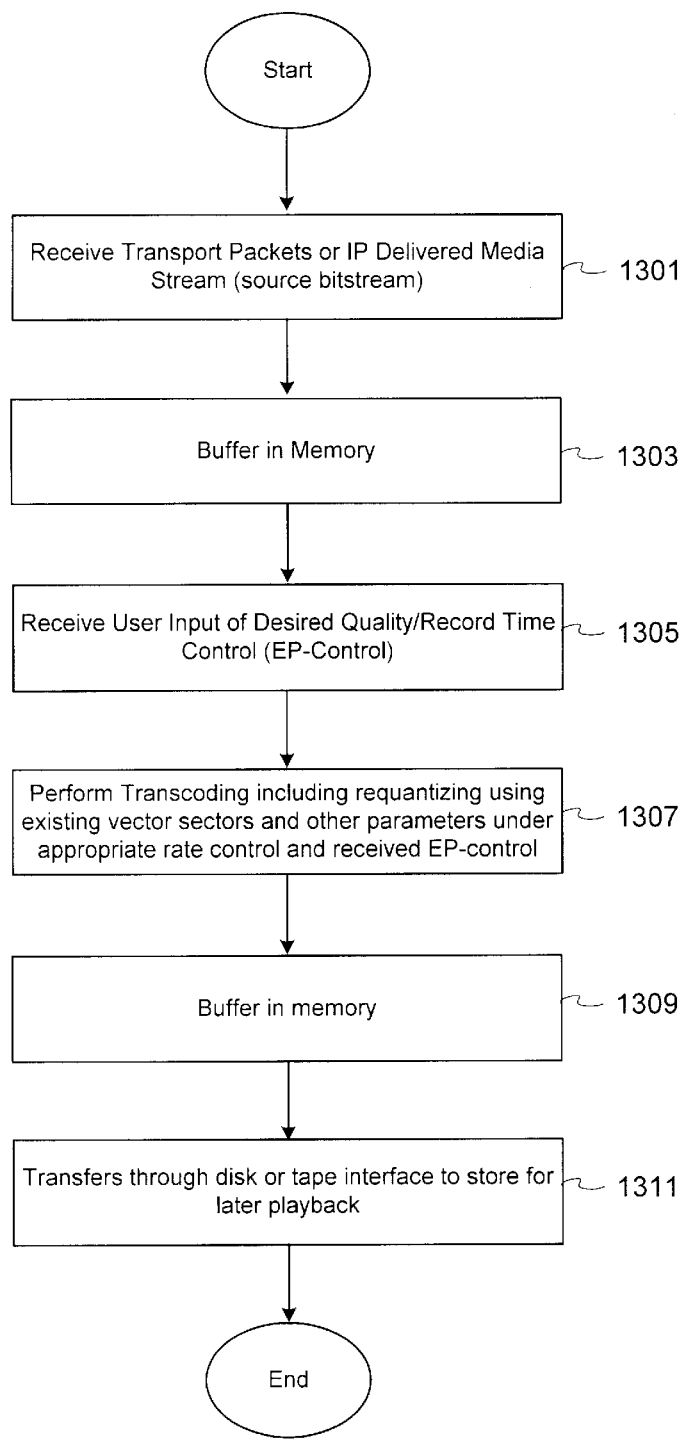
FIG. 13 is a flowchart illustrating a method for transcoding and storing a source bitstream in conjunction with an extended play mode, according to an embodiment of the invention.

Continuing with FIG. 13, partial re-encode transcoding can be conducted by VIDEO DEVICE 1200 (FIG. 12) in a similar manner as with complete re-encode transcoding, except for the re-use of coding parameters. More specifically, MPEG transport packets or an IP delivered media stream are received in a conventional manner by a input buffer (steps 1301 and 1303). Any EP controls are also received (step 1305) and transcoding is initiated. In order for any bitrate modification to be performed, however, "base" values must of course be established. Thus, an appropriate base bitrate needs to be established for "generic" encoder re-quantizing, and then the base value can be modified according to received EP controls (step 1307), as is next discussed. Following transcoding, the re-encoded bitstream is stored via a buffer (and interface) to a storage device, as discussed above (steps 1309 and 1311).

While it might be expected that quality degradation will result from the re-use of motion vectors and/or reconfiguration, this is not the case. In simulation, the same variety of source bitstreams were transcoded using the complete re-encode transcoder of FIG. 7 and the simplified transcoder (without motion estimation) of FIG. 11. Upon viewing resultant reconstructed video, the two were observed to perform very similarly in terms of the peak signal to noise ratio ("PNSR"). In fact, it has been shown that the simplified-transcoder (FIG. 11) performs identically with partial re-encode transcoding (FIG. 10) if the following conditions exist:

Motion estimation and compensation is a linear operation, so that MC(a+b)=MC(a)+MC(b) where MC( ) is a motion compensation operation, and "a" and "b" are blocks of pixels;

DCT/DCT are a perfect orthogonal transform, implying that adding/subtracting in the DCT domain is the same in the pixel domain; and Frame buffers are of enough precision to hold the reconstructed signals. In other words, no clipping operation is explicitly or implicitly involved.

In view of the foregoing, it might appear that all of the coding parameters embedded in an MPEG source bitstream should be preserved for re-encoding during partial re-encode transcoding. (Coding parameters include picture type, frame type, quantization matrices DCT type, motion estimation type, MB's code mode, motion vectors of MB, quantization parameters of MB, etc.) The inability of the transcoder to improve the quality of its input video signals by simply re-quantizing would also suggest that all coding parameters should be preserved. Given an MPEG bitstream, for example, the transcoder can convert the MPEG bitstream into another MPEG bitstream at different bitrates (e.g. as with the above-discussed EP modes), but it cannot increase the quality of the reconstructed video signals or picture quality by decreasing or increasing the bitrates.

However, while most of the coding parameters embedded in the pre-compressed source bitstream can actually be preserved or "maintained" during transcoding, the quantization parameter cannot be so preserved. Rather, in practice, the transcoder needs to adjust the quantization parameter, Q2, to achieve a new bitrate (e.g. see FIGS. 10 and 11). More specifically, during transcoding, a new quantization parameter, Q2, for the current MB is determined by a rate control scheme, which—as with conventional systems—is based upon such factors as the channel capacity, the status of encoder/decoder buffers (e.g. avoiding overflow and underflow), other program complexities, etc. Thus, a new quantization parameter (Q2) determined by a rate control scheme may well be different from the "old" quantization parameter (Q1) embedded in the input pre-compressed bitstream for the same MB.

Quantization in MPEG compression plays a key role in determining the final bitrate and the quality of the reconstructed video sequence. In MPEG syntax, the quantization parameter is allowed to vary on a MB-by-MB basis. Generally, a smaller quantization parameter generates more compressed bits and often produces a better picture quality than a larger quantization parameter for the same MB. (The same principle will also likely be generally valid where future compression techniques applied according to a conventional codec configuration.)

Figure 14:
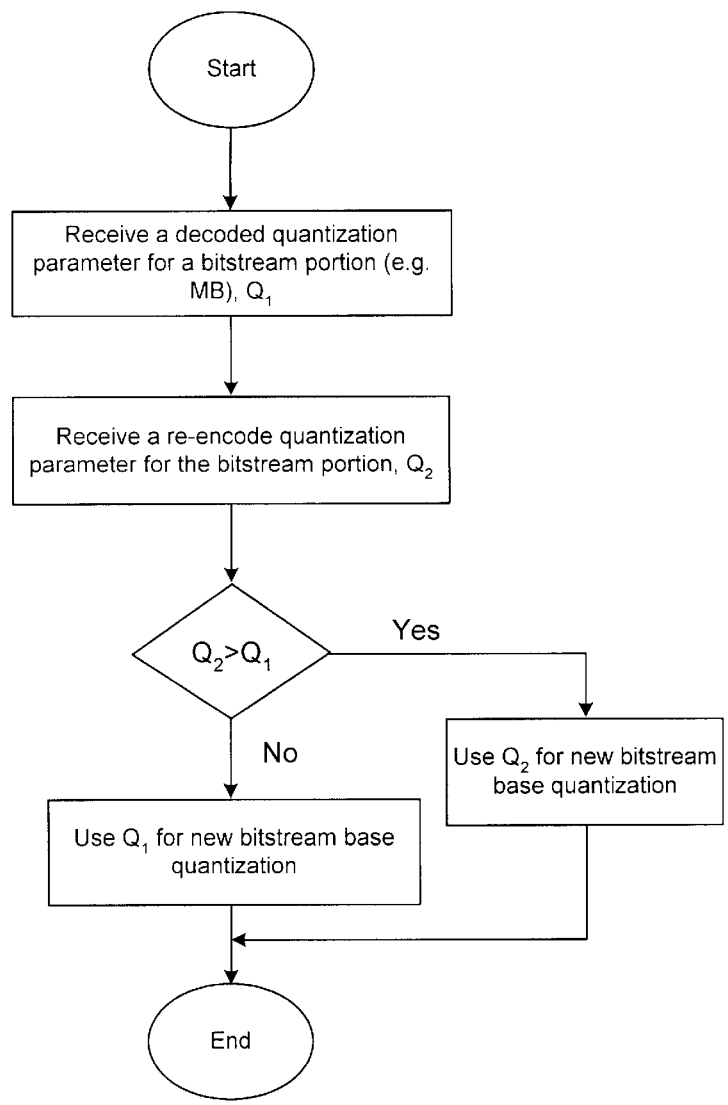
FIG. 14 is a flowchart illustrating a quantization parameter selection method according to an embodiment of the invention.

However, the same principle is not necessarily true for a transcoder architecture. Let us continue to indicate the decoded or "old" quantization parameter as Q1 and the (here, potential) re-encode or "new" quantization parameter as Q2. Here, we have assumed that the same quantization matrix is associated with both Q1 and Q2 for the current frame. Therefore, as with conventional MPEG encoding, where Q2 is larger than Q1, lower bitrate and poorer quality will result for a given MB; however, while a smaller Q2 than Q1 will certainly result in a higher MB bitrate, it may not necessarily improve the MB picture quality. Hence, using a lower Q2 than Q1 might simply waste bits, and the strategy of FIG. 14 should be adopted, whereby the greater value of Q2 and Q1 (i.e. the lower of the two bitrates) should always be used for a given MB. Stated alternatively: for a given bitstream portion (e.g. macroblock), use Q2 if Q2>Q1, and otherwise use Q1.

(For clarity, let us assume that no EP or other optional modification is being used unless specifically indicated. It should also be kept in mind that, as disclosed herein, various bitstream portions other than MBs, blocks, slices, frames, etc. might be utilized where other than MPEG-compliant code, data, constructs and/or techniques are utilized, such as objects, multiple perspectives, etc.)

The above greater quantization parameter selection or "greater-Q" strategy raises an interesting question. If the greater-Q strategy is applied and the old Q1 is selected over a new Q2 for a MB, then the MB should have the same (best) quality and number of compressed bits before and after transcoding. So, "Can we simply copy the pre-compressed bits for the MB into the same MB for the new bitstream?"

Figure 15A:
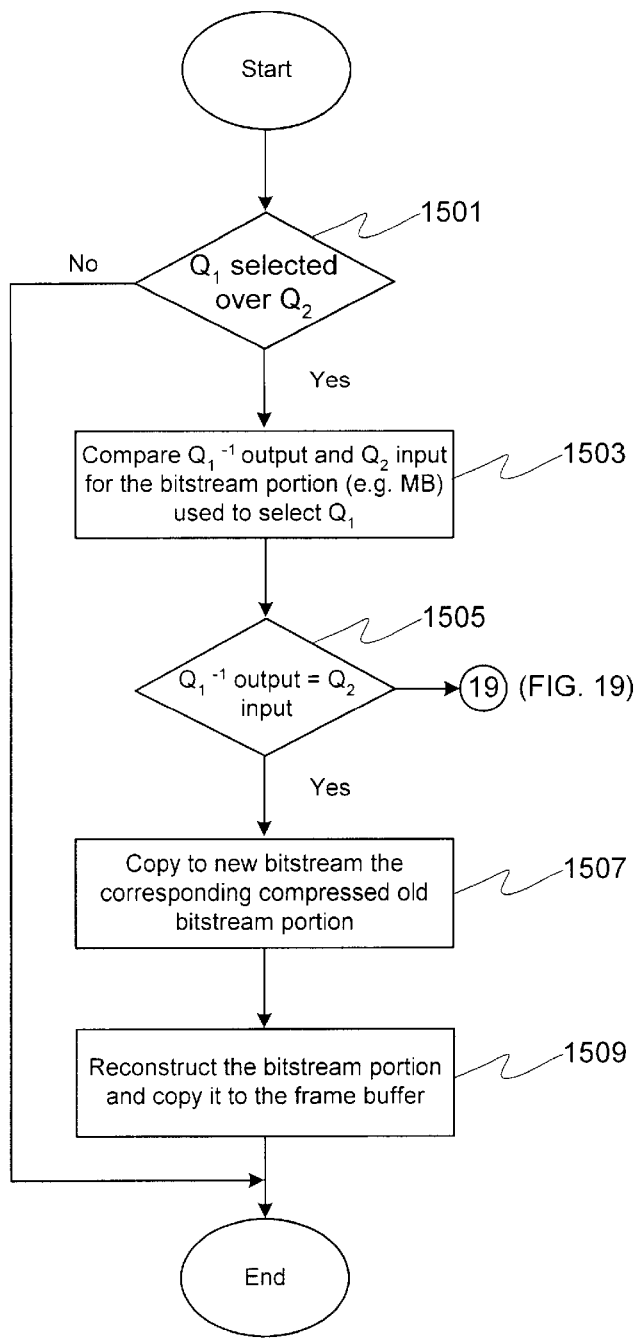
FIG. 15a is a flowchart illustrating an output-to-input type method for determining decoded macroblock re-use applicability in a cascaded-based partial re-encode transcoder according to an embodiment of the invention.
Figure 15B:
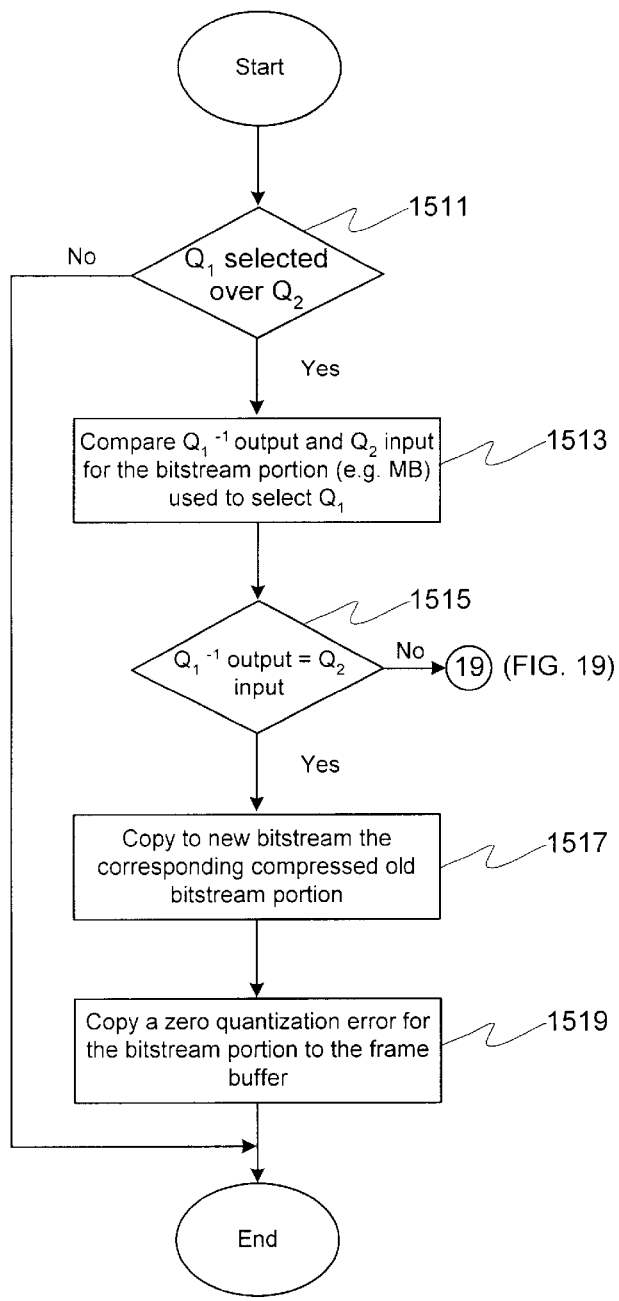
FIG. 15b is a flowchart illustrating an output-to-input type method for determining decoded macroblock re-use applicability in a simplified partial re-encode transcoder according to an embodiment of the invention.

As illustrated in FIGS. 15a and 15b, the answer is "Yes"—so long as the output of $Q1^{-1}$ or "inverse-quantization output" is the same as the input to Q2 or "encode quantization input" (i.e. the MB at (1) is equivalent to the MB at (2) in FIGS. 7, 10 or 11). This output-to-input relationship can be found to exist in any one of the following situations 1–3 in conjunction with criteria 4, thereby enabling copying operations a–c to be conducted. Thus, if
   1. the MB is coded in intra-frame mode in an I, P or B picture and complete or partial re-encode transcoding is used, or if
   2. the MB is coded in inter-frame mode in a P or B picture with the same prediction MB at both the decoder (3) and encoder (4), and cascaded-based transcoding (see FIGS. 7 and 10) is used, or if
   3. the MB is coded in inter-frame mode in P or B picture, with a zero corresponding (quantization) error compensation at point (5), or a "zero post-DCT prediction error MB," and simplified transcoding is used, and if
   4. Q1 is selected over Q2 for a MB, then
     a. the corresponding compressed bits for the MB can be copied into the new compressed bitstream or "re-encoded bitstream" directly, and
     b. the current MB reconstructed at the decoder can be copied into both the current frame buffers at the decoder and encoder, if cascaded-based transcoding (see FIGS. 7, 10 and 15a) is used, and
     c. a zero quantization error current MB can be copied into the current frame buffer, if simplified transcoding (see FIGS. 11 and 15b) is used.

This extension of the adopted greater-Q strategy will guarantee the same (best) quality and the same number of compressed bits for a current MB, and will also save on processing time.

Figure 16A:
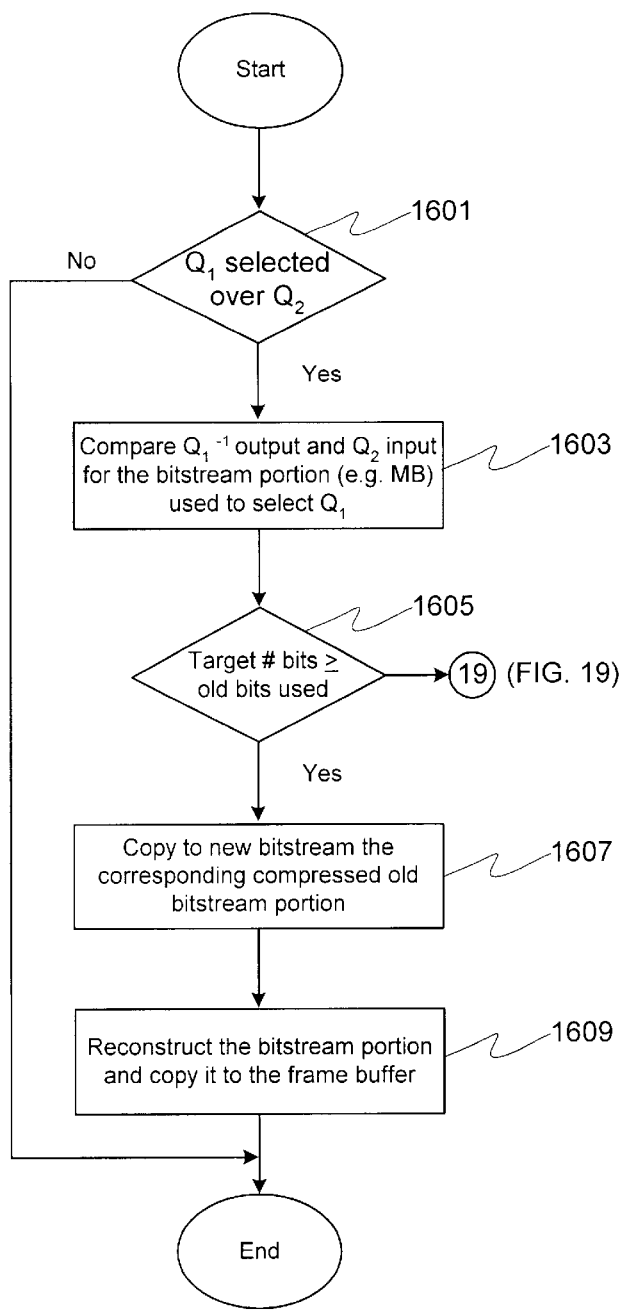
FIG. 16a is a flowchart illustrating a target number of bits type method for determining decoded macroblock re-use applicability in a cascaded-based partial re-encode transcoder according to an embodiment of the invention.
Figure 16B:
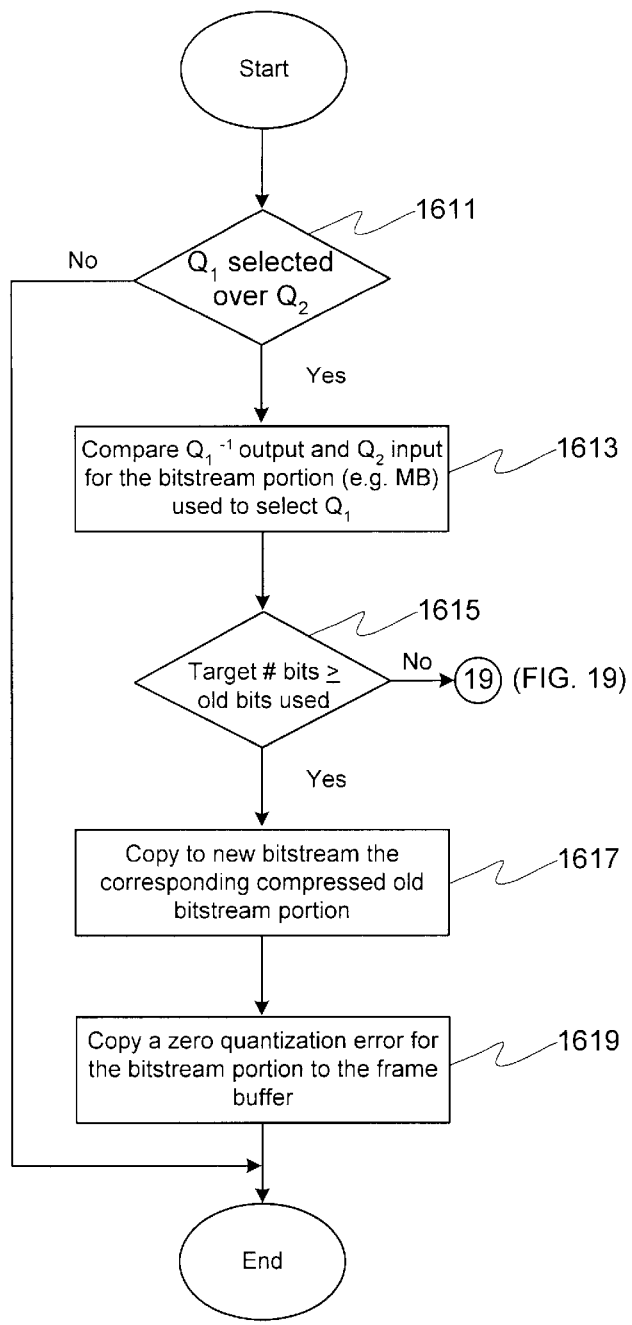
FIG. 16b is a flowchart illustrating a target number of bits type method for determining decoded macroblock re-use applicability in a cascaded-based partial re-encode transcoder according to an embodiment of the invention.

Alternatively, the "target number of bits" strategy of FIGS. 16a and 16b can also be used. More specifically, the resulting number of compressed bits for a given MB is largely determined by the quantization parameter. That is, the number of compressed bits for a MB more or less monotonically decreases as the quantization parameter increases. Hence, the decision based on comparing Q1 and Q2 can also be conducted by comparing the number of bits for a MB in the source pre-compressed bitstream or "old T" and the target number of bits determined during transcoding or "new T" (if it is available). This strategy can be written as:

if (as with output-to-input method situations)
   1. the current MB is coded in intra-frame mode in an I, P or B picture and cascaded-based or simplified transcoding is used, or if
   2. the current MB is coded in inter-frame mode in a P or B picture with the same prediction MB at both the decoder (3) and encoder (4), and cascaded-based transcoding (FIGS. 7 and 10) is used, or if
   3. the current MB is coded in inter-frame mode in P or B picture, with a zero corresponding (quantization) error compensation at point (5), or a "zero post-DCT prediction error MB," and simplified transcoding (FIG. 11) is used, and if
   4. the target number of bits assigned for a MB during transcoding is not less than the number of bits used for the same MB in the source pre-compressed bitstream, i.e., new T≧old T, then (as with output-to-input method options)
   1. the corresponding compressed bits for the MB can be copied into the new compressed bitstream or "re-encoded bitstream" directly, and
   2. the current MB reconstructed at the decoder can be copied into both the current frame buffers at the decoder and encoder, if cascaded-based transcoding (FIGS. 10 and 16a) is used, and
   3. a zero quantization error MB can be copied into the current frame buffer, if simplified transcoding (FIGS. 11 and 16b) is used.

Figure 17A:
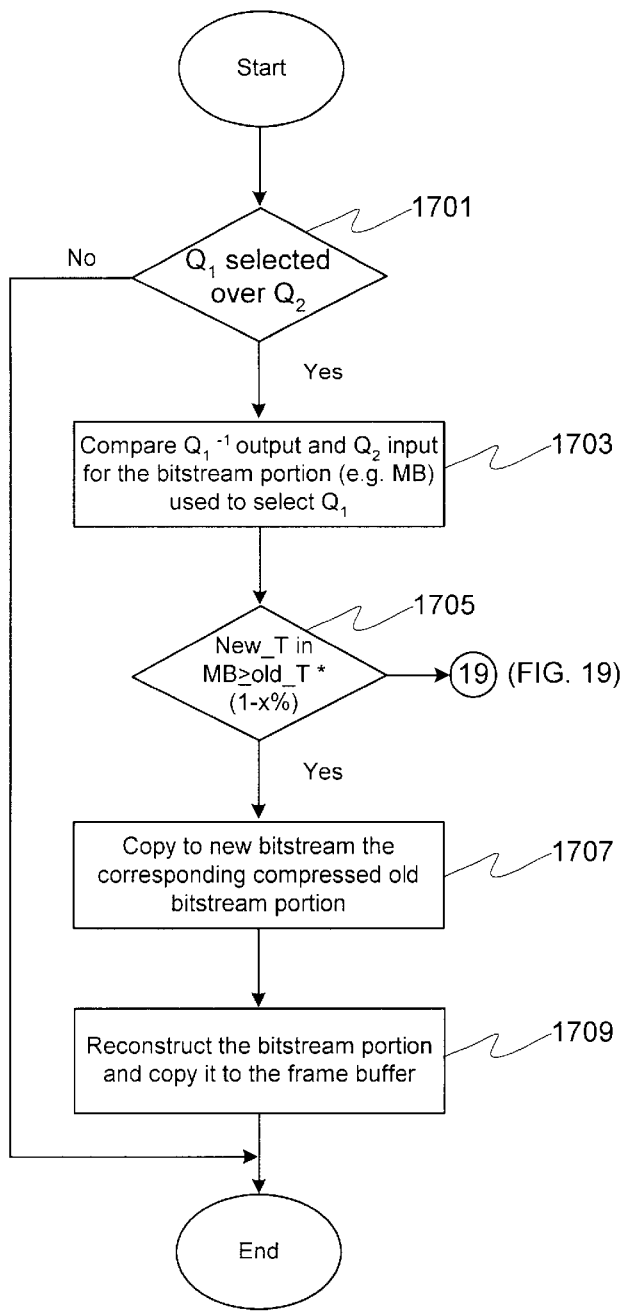
FIG. 17a is a flowchart illustrating a relaxed target number of bits type method for determining decoded macroblock re-use applicability in a cascaded-based partial re-encode transcoder according to an embodiment of the invention.
Figure 17B:
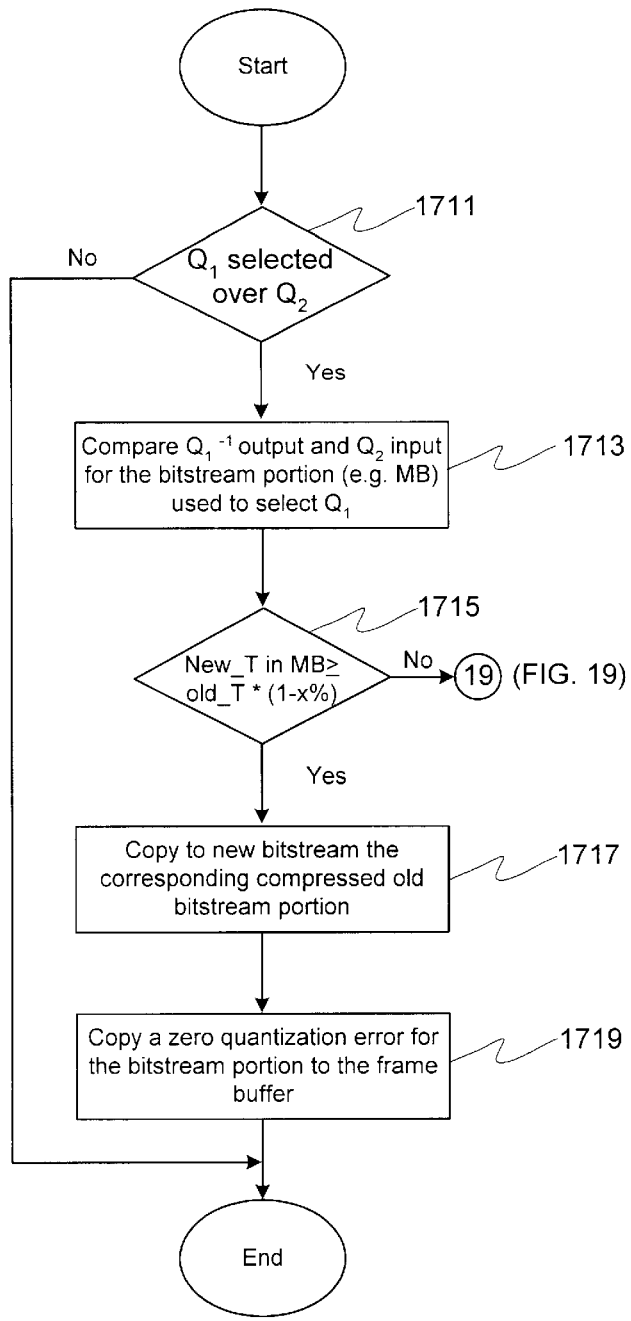
FIG. 17b is a flowchart illustrating a relaxed target number of bits type method for determining decoded macroblock re-use applicability in a simplified partial re-encode transcoder according to an embodiment of the invention.

In practicing the target number of bits strategy, the comparison of the number of bits in criteria 4 above can also be slightly relaxed, such that, for example, the expression will remain true even if a target number of bits falls below that of the source by a small percentage, i.e., new T≧(1−x %)old T where x=1 or 2 (FIGS. 17a and 17b). This small difference in bits can be easily absorbed by the next MBs through rate control.

Figure 18A:
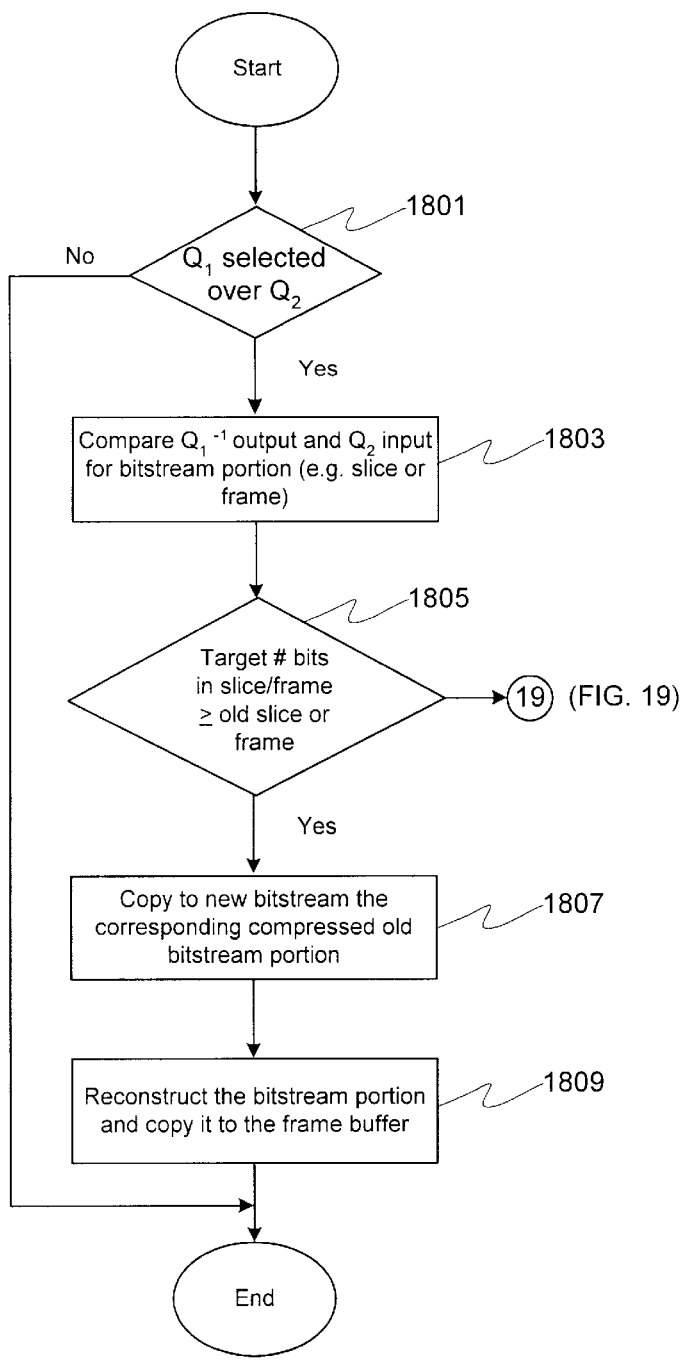
FIG. 18a is a flowchart illustrating a target number of bits type method for determining decoded slice or frame re-use applicability in a cascaded-based partial re-encode transcoder according to an embodiment of the invention.
Figure 18B:
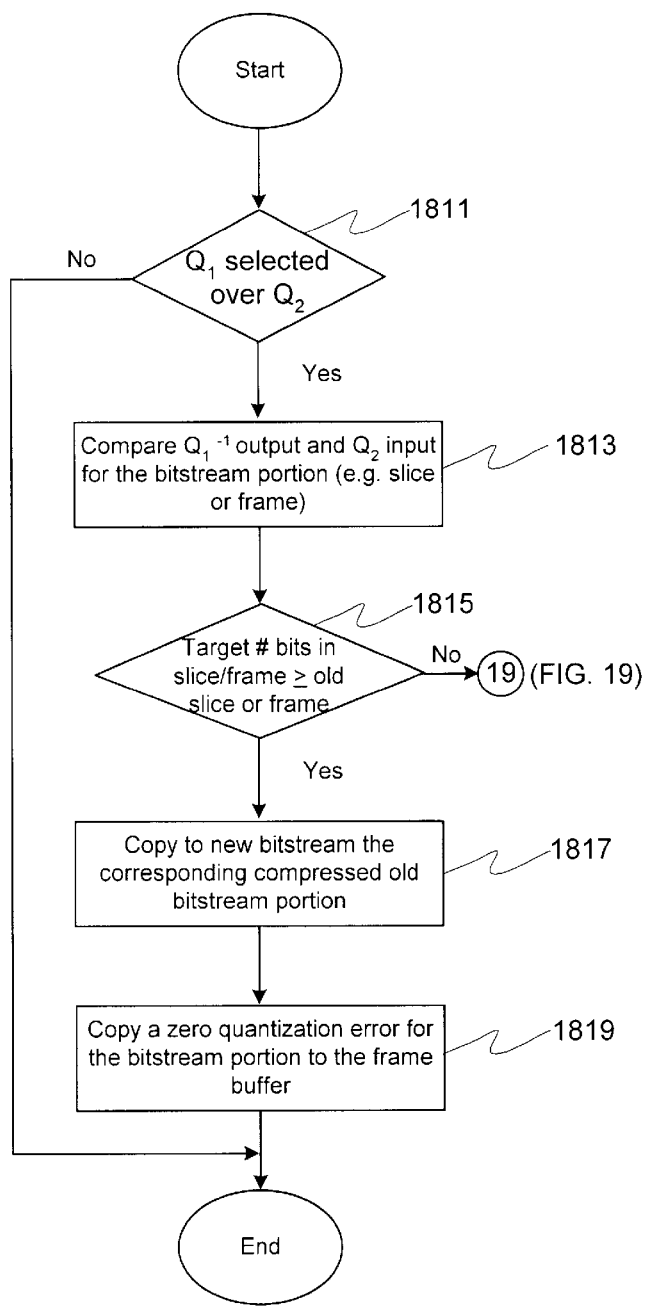
FIG. 18b is a flowchart illustrating a target number of bits type method for determining decoded slice or frame re-use applicability in a simplified partial re-encode transcoder according to an embodiment of the invention.

The principle of the target number of bits strategy can also be applied to the slice or frame level. As illustrated in FIGS. 18a and 18b, in this case, the strategy is re-written as:

if (as with the MB-based target number of bits situations)
   1. the current slice or frame is coded in intra-frame mode in an I, P or B picture and complete or partial re-encode transcoding is used, or if
   2. the current slice or frame is coded in inter-frame mode with the same prediction at both the decoder and encoder, and cascaded-based transcoding is used, or if
   3. the current slice or frame is coded in inter-frame mode with a zero corresponding (quantization) error compensation at point (5), or a "zero post-DCT prediction error MB," and simplified transcoding is used, and if
   4. the target number of bits assigned for a slice or frame during transcoding is not less than the number of bits used for the same slice or frame in the source pre-compressed bitstream by a small percentage, then
   a. the corresponding compressed bits for the slice or frame can be copied into the new compressed bitstream or "re-encode bitstream" directly, and b. the slice or frame reconstructed at the decoder can be copied into both the current frame buffers the decoder and encoder, if cascaded-based transcoding (FIGS. 10 and 18a) is used, and c. a zero quantization error slice or frame can be copied into the current frame buffer, if simplified transcoding (FIGS. 11 and 18b) is used.

Figure 19:
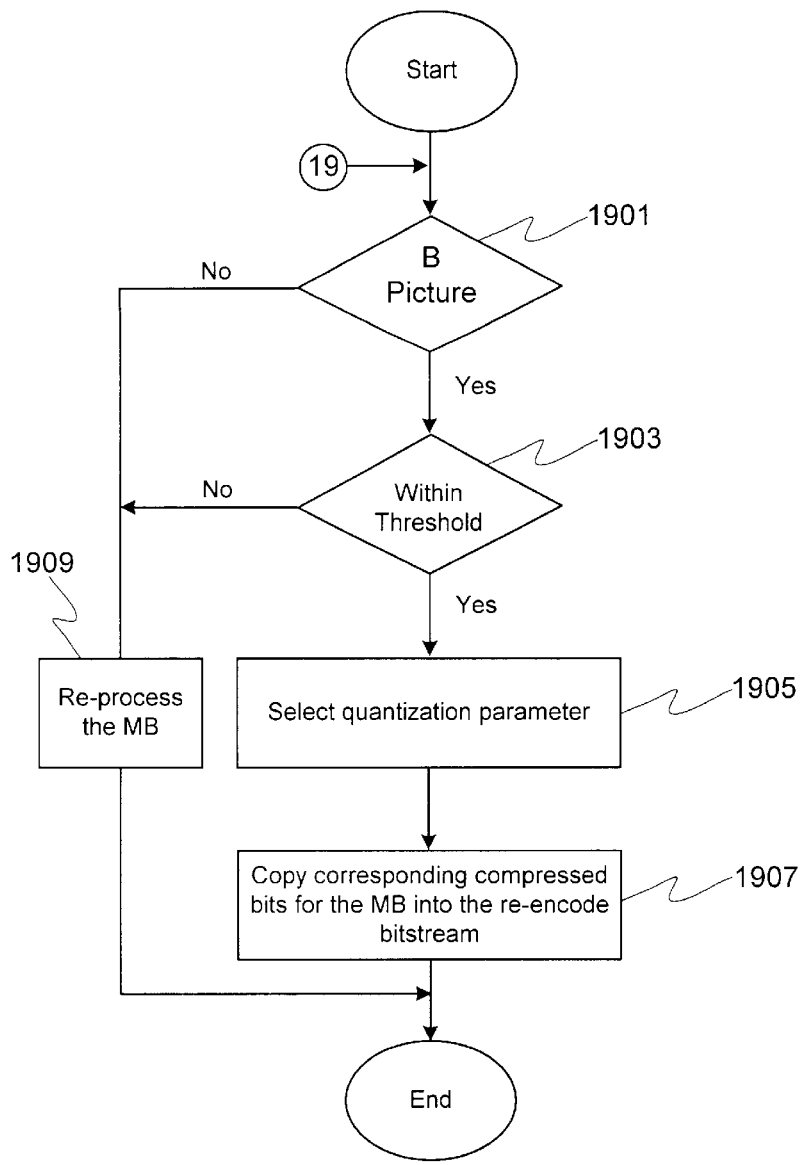
FIG. 19 is a flowchart illustrating a method for determining decoded data re-use applicability where post decode inverse quantization and pre-quantization values are not equal.

Turning to FIG. 19, a further question is, "What if the output of $Q1^{-1}$ (i.e. point (1)) is different from the input to Q2 (i.e. at point (2)) for a macroblock?" This can only happen with macroblocks that are coded in inter-frame mode, which might occur in the following situations:

1. if a MB is coded in inter-frame mode in a P or B picture, and with different prediction macroblocks at the decoder MCP output (point (3)) and encoder MCP output (point (4))—with complete or partial re-encode transcoding, or 2. if a MB is coded in inter-frame mode in a P or B picture having a non-zero corresponding (quantization) error compensation macroblock (point (5))—with simplified transcoding.

A transcoded macroblock will have, in either situation (even with the same old Q1), a different quality and number of compressed bits as compared with the decoded macroblock. This is because, for the current macroblock, the output of $Q1^{-1}$ (point (1)) is not the same as the input to Q2 (point (2)). As a result, copying the data at point (2) can cause a drifting problem and to avoid drifting, the data at point-2 must be reprocessed (e.g. via quantization/VLC).

However, re-quantizing a macroblock using a larger old Q1 (i.e. when the new Q2<the old Q1) is still valid and efficient. In general, the maximum possible quantization distortion of a sample for a quantizer is proportional to the quantization step size (e.g. a combination of quantization matrix and quantization parameter in MPEG). For example, for a uniform quantizer, the maximum quantization error of a sample is one half of the quantization step size. Thus, using the same old Q1 for a macroblock will at least guarantee that the distortion for the macroblock after transcoding is under the same maximum distortion. In addition, use of a larger old Q1 will also result in fewer compressed bits than the new smaller Q2 for the macroblock. Still further, the quantization errors will be compensated for by the feedback loop in both cascaded-based and simplified transcoder (FIGS. 7, 10–11).

Furthermore, B pictures are never used as references for the future temporal prediction and therefore they can tolerate more distortion. Hence, for a macroblock in a B picture:

If the new Q2<the old Q1 and the difference at point (1) versus point (2) in FIGS. 7, 10–11 is within a certain threshold, then the transcoder can still select the old Q1 and copy the corresponding compressed bits into the new compressed bitstream directly.

Figure 20:
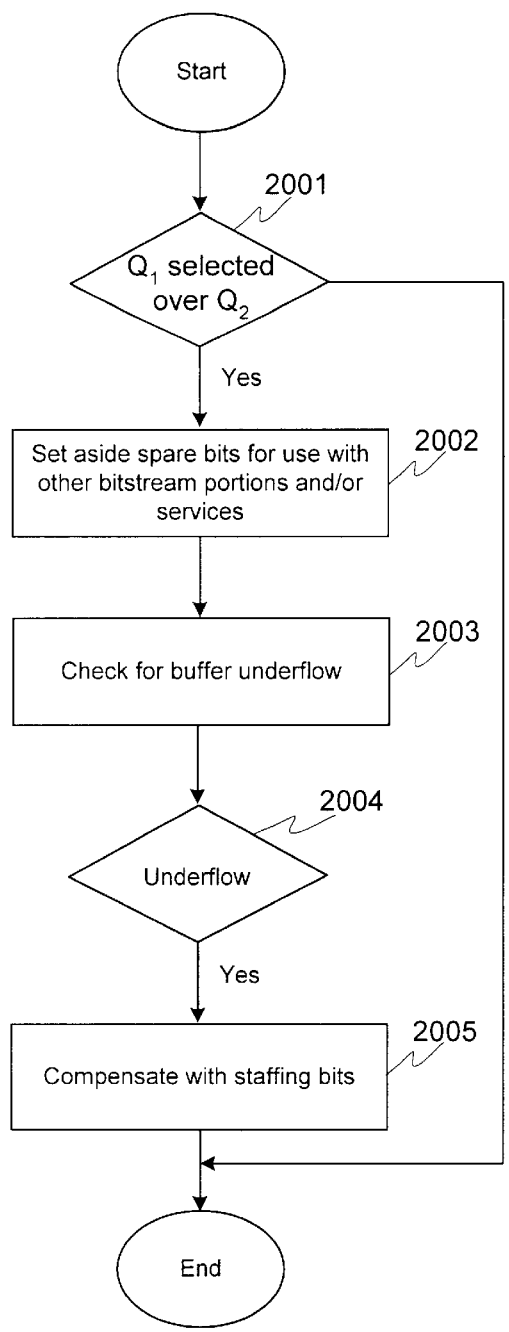
FIG. 20 is a flowchart illustrating a method for handling spare bits resulting from the use of a greater quantization parameter for re-encoding, according to an embodiment of the invention.

Another issue with the proposed strategy is rate control. As noted, it is generally possible for a smaller new quantization parameter to be assigned to a MB by rate control engine, implying that rate control tends to give more bits for the MB. The above strategy in which the greater of Q1 and Q2 is used is actually against rate control. It will be very likely to result some leftover bits when Q1, instead of Q2, is chosen for a MB. As illustrated in FIG. 20, the leftover bits can be passed to the next macroblock, the next slice or the next frame for a single transcoder, or even to other programs for multiple transcoders (e.g. in a stat mux/re-mux system). The spare bits can also be set aside for ABR services (e.g. data channels) or other emerging two-way services such as IP telephony, Internet access, etc.

The effect on the vbv buffer should, however, be taken into account. Using a larger Q1 over a smaller Q2 for a macroblock will not likely result in buffer overflow, but buffer underflow is possible. Hence, the transcoder should verify the buffer occupancy whenever the old Q1 is selected over the new Q2 for the current macroblock during transcoding. If the buffer becomes empty, staffing or "null bits" can be inserted.

Thus, while the present invention has been described herein with reference to particular embodiments thereof, a latitude of modification, various changes and substitutions are intended in the foregoing disclosure, and it will be appreciated that in some instances some features up the invention will be employed without a corresponding use of other features without departing from the scope and spirit of the invention as set forth. Therefore, many modifications may be made to adapt a particular situation or material to the central scope and spirit of the present invention. It is intended that the invention not be limited to the particular embodiment disclosed as the best mode to contemplated for carrying out this invention, but that the invention will include all embodiments and equivalents falling within the scope of the appended claims.

What is claimed is:

1. A method for determining an optimal re-encode quantization parameter, comprising:

receiving a decoded quantization parameter, Q1, of a bitstream portion;

receiving a re-encode quantization parameter, Q2, of the bitstream portion;

comparing Q1 and Q2; and selecting Q2 as the optimal re-encode quantization parameter if Q2 is greater than Q1, and otherwise selecting Q1 as the optimal re-encode quantization parameter.

2. A method for forming a re-encoded bitstream portion, the method comprising:

(a) receiving a compressed bitstream portion having a first quantization parameter, Q1;

(b) initiating decoding of said compressed bitstream portion to produce said first quantization parameter, Q1;

(c) receiving a second quantization parameter, Q2;

(d) determining that Q2 is less than Q1;

(e) determining that a signal derived from Q1 is substantially equal to Q2 when the quantization error signal is below a predetermined threshold;

(f) copying said compressed bitstream portion to produce a re-encoded bitstream portion; and (g) reconstructing said bitstream portion to form a reconstructed bitstream portion.

3. The method of claim 2, wherein said bitstream portion is selected from a group consisting of macroblocks, slices and frames.

4. The method of claim 2, wherein said step (e) of determining comprises comparing an inverse quantization output to a quantization input.

5. The method of claim 2, wherein said step (e) of determining comprises determining that a first total number of bits, T1, of an inverse quantization output is equal to a second total number of bits, T2, of a quantization input.

6. The method of claim 5, further including copying a zero quantization error bitstream portion into a frame buffer.

7. The method of claim 2, wherein said step (e) of determining comprises determining that a first total number of bits, T1, of an inverse quantization output is within a small percentage of a second total number of bits, T2, of a quantization input.

8. The method of claim 2, further including:
storing a zero quantization error of the said bitstream portion into a frame buffer.

9. A re-encoded bitstream portion formed according to the method of claim 2.

10. The method of claim 2, wherein the received bitstream portion is obtained from a storage device.

11. A computer readable storage medium storing program code for causing a processing system to perform the steps of:
receiving a decoded quantization parameter, Q1, of a bitstream portion;
receiving a re-encode quantization parameter, Q2, of the bitstream portion;
comparing Q1 and Q2; and
selecting Q2 as the optimal re-encode quantization parameter if Q2 is greater than Q1, and otherwise selecting Q1 as the optimal re-encode quantization parameter.

12. A transcoder comprising:
a decoder for producing a coding parameter of a received bitstream portion; and
an encoder coupled to said decoder for producing a re-encode parameter corresponding to said received bitstream portion, comparing said re-encode parameter to said coding parameter and copying said received bitstream portion to a re-encode bitstream according to a predetermined determined correspondence between said parameters.

13. A transcoder according to claim 12, wherein said coding parameter is a quantization parameter of said received bitstream portion and said re-encode parameter is a re-encode quantization parameter.

14. A transcoder comprising:
means for receiving a decoded quantization parameter, Q1, of a bitstream portion;
means for receiving a re-encode quantization parameter, Q2, of the bitstream portion:
means for comparing Q1 and Q2 and
means for selecting Q2 as the optimal re-encode quantization parameter if Q2 is greater than Q1, and otherwise selecting Q1 as the optimal re-encode quantization parameter.

15. A method for forming a re-encoded bitstream portion, comprising:
(a) receiving a compressed bitstream portion having a first quantization parameter, Q1;
(b) initiating decoding of said compressed bitstream portion to produce said first quantization parameter, Q1, and an inverse quantization output;
(c) initiating re-encoding of said decoded bitstream portion to form a second quantization parameter, Q2, and a quantization input;
(d) determining that Q2 is less than Q1;
(e) determining that said bitstream portion corresponds to a B-picture;
(f) copying said compressed bitstream portion to produce the re-encoded bitstream portion; and
(g) reconstructing said bitstream portion to form a reconstructed bitstream portion and storing said reconstructed bitstream portion in a frame buffer.

16. The method of claim 15, wherein said step (g) is replaced by storing a zero quantization error bitstream portion into said frame buffer.

17. A method for disposing of spare bits resulting from transcoding, comprising:

receiving a decoded quantization parameter, Q1, of a bitstream portion;
receiving a re-encode quantization parameter, Q2, of the bitstream portion;
determining that Q1 is greater than Q2;
selecting Q1 as an replacement re-encode quantization parameter; and
passing spare bits resulting from said replacement to another bitstream portion.

18. A method for re-encoding a first bitstream to a second bitstream, the method comprising:
receiving a decoded quantization parameter, Q1, of a first bitstream portion;
receiving a re-encode quantization parameter, Q2, of the first bitstream portion;
comparing Q1 and Q2;
selecting Q2 as the optimal re-encode quantization parameter if Q2 is greater than Q1, and otherwise selecting Q1 as the optimal re-encode quantization parameter; and
using the selected re-encode quantization parameter to produce a second bitstream at a different bitrate from the first bitstream.

19. A method for re-encoding an MPEG-compliant bitstream having macroblocks and I, P and B pictures, wherein the method uses hardware including a decoder and an encoder, wherein the bitstream is initially encoded with a first quantization parameter, Q1, wherein it is desired to re-encode the bitstream at a second quatization parameter, Q2, the method comprising:
selecting a macroblock in the bitstream;
determining whether one of the following three conditions is true regarding the selected macroblock
(a) that the selected macroblock is coded in intra-frame mode in an I, P or B picture using complete or partial re-encode transcoding;
(b) that the selected macroblock is coded in inter-frame mode in a P or B picture with a same prediction macroblock at both the decoder and encoder, and that cascade-based transcoding is used;
(c) that the selected macroblock is coded in inter-frame mode in a P or B picture with a zero corresponding quantization error compensation derived from a discrete-cosine transformation calculation, and simplified transcoding is used
then, if one of the conditions in the determining step is true, performing the following steps:
selecting Q1 over Q2 for the selected macroblock;
copying compressed bits from the selected macroblock directly into a re-encoded bitstream;
if cascaded-based transcoding is used then storing at least a portion of the selected macroblock for later access by the decoder or encoder;
else if simplified transcoding is used and the selected macroblock has zero quantization error then copying the selected macroblock into the current frame buffer.

20. A method for re-encoding an MPEG-compliant bitstream having macroblocks and I, P and B pictures, wherein the method uses hardware including a decoder and an encoder, wherein the bitstream is initially encoded with a first quantization parameter, Q1, wherein it is desired to re-encode the bitstream at a second quatization parameter, Q2, the method comprising:

selecting a macroblock in the bitstream;

first determining whether a target number of bits assigned for a macroblock during transcoding is not less than a source number of bits used for the same macroblock in a source precompressed bitstream and, if so, proceeding to the second determining step, below;

second determining whether one of the following three conditions is true regarding the selected macroblock
   (a) that the selected macroblock is coded in intra-frame mode in an I, P or B picture using cascaded-based or simplified transcoding;
   (b) that the selected macroblock is coded in inter-frame mode in a P or B picture with a same prediction macroblock at both the decoder and encoder, and that cascade-based transcoding is used;
   (c) that the selected macroblock is coded in inter-frame mode in a P or B picture with a zero corresponding quantization error compensation derived from a discrete-cosine transformation calculation, and simplified transcoding is used;

then, if one of the conditions in the second determining step is true, performing the following steps:

copying compressed bits from the selected macroblock directly into a re-encoded bitstream;

if cascaded-based transcoding is used then storing at least a portion of the selected macroblock for later access by the decoder or encoder;

else if simplified transcoding is used and the selected macroblock has zero quantization error then copying the selected macroblock into the current frame buffer.

21. The method of claim 20, wherein the first determining step is deemed true even if the target number of bits falls below the source number of bits by a predetermined threshold.

22. The method of claim 21, wherein the first determining step is deemed true even if the target number of bits falls below the source number of bits for a slice by a predetermined threshold.

23. The method of claim 22, wherein the first determining step is deemed true even if the target number of bits falls below the source number of bits for a frame by a predetermined threshold.

24. The method of claim 20, further comprising reprocessing data at the encoder to prevent drifting.

25. The method of claim 20, further comprising identifying leftover bits resulting in encoding a first macroblock using Q1; and using the leftover bits in the processing of a second macroblock.

* * * * *